United States Patent
Palmore et al.

(10) Patent No.: US 11,374,211 B2
(45) Date of Patent: Jun. 28, 2022

(54) CATION ENERGY STORAGE DEVICE AND METHODS

(71) Applicant: Brown University, Providence, RI (US)

(72) Inventors: G. Tayhas R. Palmore, Providence, RI (US); Dan Liu, Providence, RI (US)

(73) Assignee: BROWN UNIVERSITY, Providence, RI (US)

( * ) Notice: Subject to any disclaimer, the term of this patent is extended or adjusted under 35 U.S.C. 154(b) by 0 days.

(21) Appl. No.: 16/862,286

(22) Filed: Apr. 29, 2020

(65) Prior Publication Data

US 2021/0083265 A1    Mar. 18, 2021

Related U.S. Application Data

(63) Continuation of application No. 15/564,711, filed as application No. PCT/US2016/026496 on Apr. 7, 2016, now Pat. No. 10,673,065.

(60) Provisional application No. 62/144,021, filed on Apr. 7, 2015.

(51) Int. Cl.
| | |
|---|---|
| *H01M 4/136* | (2010.01) |
| *H01M 10/054* | (2010.01) |
| *H01M 4/36* | (2006.01) |
| *H01M 4/58* | (2010.01) |
| *C01B 25/37* | (2006.01) |
| *H01M 4/62* | (2006.01) |
| *C01B 25/45* | (2006.01) |
| *C01B 25/38* | (2006.01) |
| *C01B 25/445* | (2006.01) |
| *H01M 10/0525* | (2010.01) |
| *H01M 10/052* | (2010.01) |

(52) U.S. Cl.
CPC .......... *H01M 4/136* (2013.01); *C01B 25/375* (2013.01); *C01B 25/38* (2013.01); *C01B 25/445* (2013.01); *C01B 25/45* (2013.01); *H01M 4/366* (2013.01); *H01M 4/5825* (2013.01); *H01M 4/62* (2013.01); *H01M 4/625* (2013.01); *H01M 10/054* (2013.01); *H01M 10/0525* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 6,815,122 B2 | 11/2004 | Barker et al. | |
| 9,077,032 B2 | 7/2015 | Doe et al. | |
| 10,673,065 B2 * | 6/2020 | Palmore | H01M 10/054 |
| 2002/0039687 A1 | 4/2002 | Barker et al. | |
| 2005/0234132 A1 * | 10/2005 | Gatfield | A61Q 11/00 |
| | | | 514/627 |
| 2007/0207385 A1 * | 9/2007 | Liu | C01B 25/45 |
| | | | 429/231.9 |
| 2010/0323231 A1 * | 12/2010 | Sakai | H01M 50/449 |
| | | | 429/144 |
| 2011/0008233 A1 | 1/2011 | Miyanaga et al. | |
| 2011/0052986 A1 | 3/2011 | Barker et al. | |
| 2011/0272639 A1 | 11/2011 | Bramnik et al. | |
| 2012/0001120 A1 | 1/2012 | Yamakaji et al. | |
| 2012/0219859 A1 * | 8/2012 | Doe | H01M 4/5825 |
| | | | 429/219 |
| 2013/0017442 A1 | 1/2013 | Cha et al. | |
| 2013/0323607 A1 | 12/2013 | Issaev et al. | |
| 2013/0337329 A1 | 12/2013 | Oono et al. | |

OTHER PUBLICATIONS

Hu, L.-H., Wu, F.-Y., Lin, C.-T., Khlobystov, A.N., Li, L.-J.—Graphene-modified LiFePO4 cathode for lithium ion battery beyond theoretical capacity, Nature Communications, published on Apr. 9, 2013 (Year: 2013).*

Richardson, T.J.—Phosphate-Stabilized Lithium Intercalation Compounds, https://escholarship.org/uc/item/1rd917bh, published on Jul. 22, 2002 (Year: 2002).*

Legrouri, A., Lenzi, J., Lenzi, M.—Preparation and Thermal Properties of a Series of Mixed Calcium-Cobalt Phosphates, Journal of Thermal Analysis, vol. 41 (1994), pp. 1041-1052 (Year: 1994).*

"Ammonium Iron(II) Sulfate Hexahydrate", American Elements, CAS #: 7783-85-9, Linear Formula: (NH4)2Fe(SO4)2—6H2O, MDL No. MFCD00150530, EC No. 233-151-8, Retrieved form "https://www.americanelements.com/ammonium-iron-ii-sulfate-hexahydrate-7783-85-9", 2020, 7 pages.

Carlier, et al., "NaMnFe2(PO4)3 Alluaudite Phase: Synthesis, Structure, and Electrochemical Properties As Positive Electrode in Lithium and Sodium Batteries", Chemistry of Materials, vol. 22, Issue 19, 2010, pp. 5554-5562.

Hatert, "Na4Fe2+Fe3+(Po4)3, A New Synthetic Nasicon-Type Phosphate", Acta Crystallographica Section E, vol. E65, 2009, pp. i30.

Hu, et al., "Graphene-Modified LiFePo4 Cathode for Lithium Ion Battery Beyond Theoretical Capacity", Nature Communications, vol. 4, Article 1687, Apr. 9, 2013, pp. 1-7.

International Search Report and Written Opinion received in International Application No. PCT/US2016/026496 dated Jul. 21, 2016, 15 pages.

Karami, et al., "Synthesis, Characterization And Application of Li3Fe2(Po4)3 Nanoparticles As Cathode of Lithium-Ion Rechargeable Batteries", Journal of Power Sources, vol. 196, Aug. 2011, pp. 6400-6411.

(Continued)

*Primary Examiner* — Anca Eoff

(74) *Attorney, Agent, or Firm* — Adler Pollock & Sheehan P.C.; Vinit Kathardekar

(57) ABSTRACT

An energy storage composition can be used as a new Na-ion battery cathode material. The energy storage composition with an alluaudite phase of $A_xT_y(PO4)_z$, $Na_xT_y(PO4)_z$, $Na_{1.702}Fe_3(PO4)_3$ and $Na_{0.872}Fe_3(PO4)_3$, is described including the hydrothermal synthesis, crystal structure, and electrochemical properties. After ball milling and carbon coating, the compositions described herein demonstrate a reversible capacity, such as about 140.7 mAh/g. In addition these compositions exhibit good cycling performance (93% of the initial capacity is retained after 50 cycles) and excellent rate capability. These alluaudite compounds represent a new cathode material for large-scale battery applications that are earth-abundant and sustainable.

10 Claims, 18 Drawing Sheets

(56) References Cited

OTHER PUBLICATIONS

Legrouri, et al., "Preparation and Thermal Properties of a Series of Mixed Calcium-Cobalt Phosphates", Journal of Thermal Analysis, vol. 41, 1994, pp. 1041-1052.
Masquelier, "A Powder Neutron Diffraction Investigation of the Two Rhombohedral NASICON Analogues: γ-Na3Fe2(PO4)3 and Li3Fe2(PO4)3", Chemistry of Materials, vol. 12, No. 2, Jan. 13, 2000, pp. 525-532.
Richardson, "Phosphate-Stabilized Lithium Intercalation Compounds", Journal of Power Sources, vol. 119-121; Available at https://escholarship.org/uc/item/1rd917bh, Jul. 22, 2002, 15 pages.

* cited by examiner

FIG. 1

|  | Li | Na |
|---|---|---|
| Atomic Weight | 6.9 g/mol | 23 g/mol |
| Cation Radius | 0.76 Å | 1.02 Å |
| Standard Electrode Potential | -3.04V (Li$^+$/Li) | -2.71V (Na$^+$/Na) |
| Terrestrial Reserve | 25th Most Abundant Element | 6th Most Abundant Element |
| Cost, Carbonates | $6000/Ton | $150/Ton |
| Minerals | About 150 Kinds | Many More... |

(a)

(b)

Theoretical Capacity: ~160 mAh/g, Close to LiFePO$_4$.

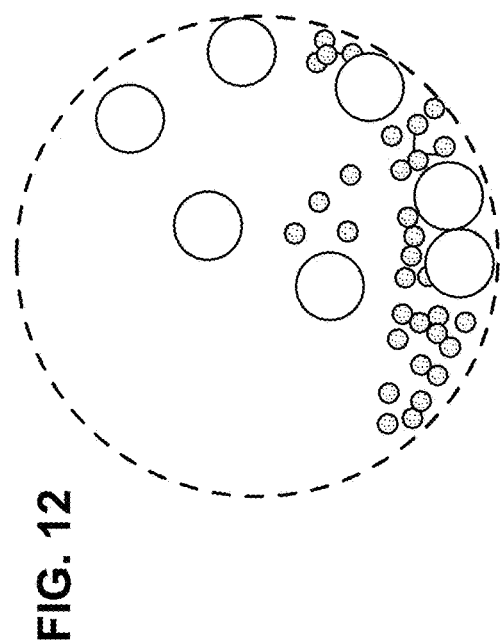
FIG. 12
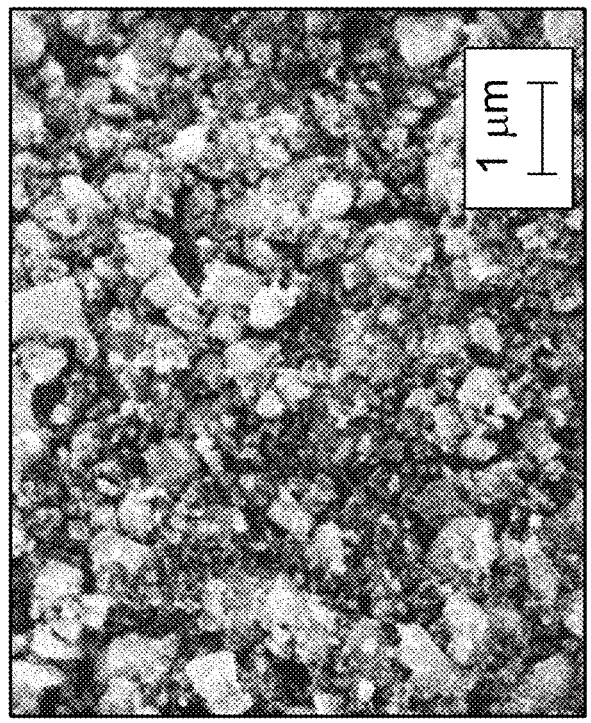
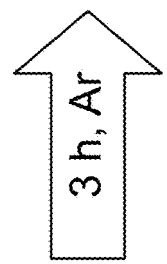
FIG. 13
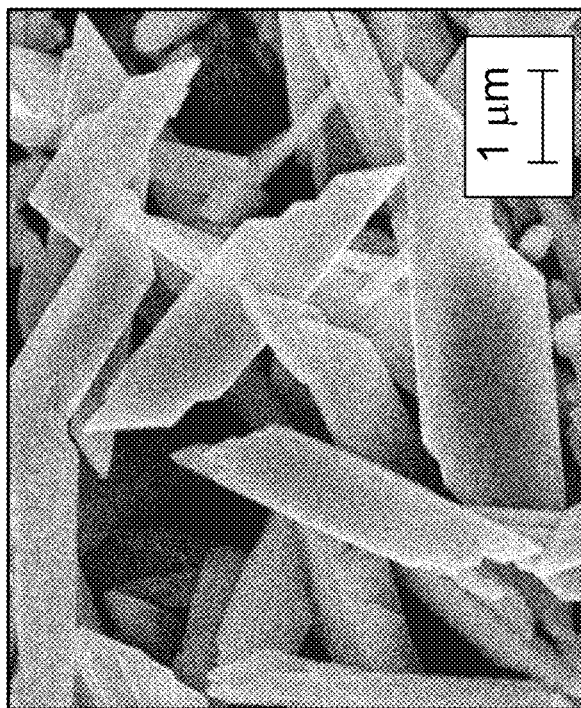

CATION ENERGY STORAGE DEVICE AND METHODS

CROSS-REFERENCE TO RELATED APPLICATIONS

The present application is a Continuation of U.S. patent application Ser. No. 15/564,711 now U.S. Pat. No. 10,673,065, wherein the U.S. patent application Ser. No. 15/564,711 is a National Stage Application of PCT/US2016/026496 filed Apr. 7, 2016 which claims priority to U.S. Provisional Application No. 62/144,021 filed on Apr. 7, 2015.

TECHNICAL FIELD

The disclosure relates generally to energy storage compositions. More specifically, energy storage compositions that can be used as cathode materials. The disclosure also relates to methods of making energy storage compositions using hydrothermal processes. The disclosure also describes methods of using energy storage compositions.

INTRODUCTION

The demand for efficiency improvements in energy storage systems is driving the development of batteries with higher energy density, increased depth of discharge, longer life cycles, and lighter, flexible form factors. Most current research efforts are directed towards Lithium-ion (Li-ion) batteries because of their inherent higher energy density compared to other types of rechargeable battery chemistries, and their negligible memory effect after numerous charge-discharge cycles. Thus, for approximately the past twenty years, significant resources have been directed toward improving the electrochemical performance of active electrode materials, developing safer electrodes and electrolytes, and lowering the manufacturing cost of Li-ion batteries.

However, Li-ion batteries are designed to meet specific application requirements and tradeoffs are often made between various parameters, such as high energy density vs. high power, charge-discharge rate vs. capacity and cycle life, safety vs. cost, etc. These tradeoffs become necessary, primarily due to the limitations imposed by the electrochemical properties of the active materials, electrolytes, and separators as well as battery manufacturing methods.

Lithium-ion batteries are manufactured in various shapes and sizes and are widely used in various types of portable electronic devices, including medical devices and are also being considered for use in electric vehicles, solar power systems, smart electricity grids, and electric tools. Current Li-ion battery technology, however, is limited in terms of energy capacity, charging speed, and manufacturing cost. Based on Department of Energy (DOE) reports, ten years of effort, and billions in spending on Li-ion battery development, the manufacturing cost of Li-ion batteries has not decreased significantly and is still three to six times higher than the DOE target ($700/kWh-current vs. $150/kWh-target).

The concern about the overuse of fossil fuels has stimulated research on sustainable approaches to meet our energy demands. One solution is to make better use of renewable energy, such as solar, wind, and wave power. However, these sources of energy vary in time and space, thus stimulating a demand to develop efficient and reliable energy storage systems. The Li-ion battery dominates the portable electronic market because of its high energy density, flexible design, and long service life. However, the increasing costs and potential geopolitical constraints on lithium reserves make Li-ion batteries unsuitable for large-scale energy storage applications.

Furthermore, performance of Li-ion batteries has not improved as expected, especially for scalable manufacturing platforms. A key contributor to the price stagnation and performance plateau is continued reliance on the same traditional battery manufacturing technology using roll-to-roll foil lamination that was developed over twenty years ago. Another contributing factor is the synthesis of the powder based active electrode material, which constitutes 40-50% of the battery cost. Thus, a new battery design and manufacturing paradigm is required to address cost issues. Also, graphite anode based Li-ion battery technology is limited in terms of energy capacity, charging speed, and safety. Because of limited anode capacity, batteries require charging more often. Competitive anode solutions have not overcome fundamental challenges, resulting in limited calendar life as well as slow charging.

Previous solid state synthesis provided a cathode material under proper conditions that will improve battery performance, as elevated temperature annealing causes the cathode material to crystallize. However, elevated temperature annealing increases the cost of cathode manufacturing.

Lithium-ion, sodium-ion (Na-ion), or Li—Na multi-ion secondary batteries are known to have high energy densities. For sufficient power, thick cathodes are employed in these batteries. Over the years, these cathodes were fabricated by a series of complex and expensive techniques. Such techniques include forming nanoscale powders of active cathode material, mixing the active powder with an inert organic binder dissolved in appropriate solvent to form a slurry. Various slurry coating techniques are used to form the thick film of the cathode on a metallic substrate followed by calendaring and drying processes to fully stabilize and form the cathode. Another cathode formation scheme involves mixing the cathode material (as a nano-particle powder) with the binder powder and pressing the mixture to form a pellet or a plate cathode, followed by drying. The inert binder content in these cathodes could be as high as 30% and unnecessarily lowers the power density of batteries containing them.

However, traditional methods of making the powder and deploying the powder to make the film are cumbersome, and more streamlined methods are needed to enable wider adoption of energy compositions that are not solely lithium based.

Vacuum deposition techniques, sputtering, chemical vapor deposition, and pulse laser deposition, have been adopted to grow organic binder free inorganic cathode films. These processes are slow and expensive, and the grown films are thin, less than 5 $\mu m$. The latter are therefore suitable only for microbatteries. Adopting these processes to grow thicker film on a large area would not be economical, because the capital equipment cost or/and operation cost will be too high.

Binder-free cathode films have also been grown by electrostatic spray deposition. Here, the solution consisting of lithium, salt and metal salt dissolved in ethanol or ethanol and butyl carbitol mixture is pumped to a metallic capillary nozzle. A DC voltage above 5 kV applied between the metallic nozzle and the heated metallic substrate generates a mist by electrohydrodynamic force. The electrostatic force then moves the mist to the hot substrate at temperature between 240° C. to 450° C. where the film gets deposited by pyrolysis of the mist. About 1 to 5 μm thick film could be deposited by this technique per hour, therefore very suitable for microbatteries.

Several alluaudite compounds have been investigated for battery applications, including: $Li_xNa_{2-x}FeMn_2(PO_4)_3$, $NaMnFe_2(PO_4)_3$, $Li_{0.5}Na_{0.5}MnFe_2(PO_4)_3$ and $Li_{0.75}Na_{0.25}MnFe_2(PO_4)_3$, $Li_{0.47}Na_{0.2}FePO_4$, and $Li_{0.78}Na_{0.22}MnPO_4$. When used as cathode materials in Li-ion batteries, both $Li_{0.47}Na_{0.2}FePO_4$ (140 mAh/g) and $Li_{0.78}Na_{0.22}MnPO_4$ (135 mAh/g) exhibit relatively high capacity and good cycling performance. However, when used as cathode materials in Na-ion batteries, these materials exhibit poor electrochemical properties including low capacity and significant polarization under load.

The alluaudite compositions described herein improve the performance of alluaudite materials. In particular the ability to improve the performance of energy storage compositions and cathode materials in batteries. The disclosure also provides an improved method of manufacture to more efficiently make nano-scale materials (i.e. 200 nm) with improved electrochemical characteristics and reduced raw material costs.

Na-ion batteries are an excellent candidate to overcome the detrimental aspects of Lithium-ion batteries. For example Na-ion batteries should be less expensive than Li-ion batteries because the raw materials for a Na-ion battery are far more abundant than that of a Li-ion battery. Moreover, Na-ion compounds exist in a variety of novel intercalation structures that are not found as Li-ion compounds.

It is understood that both the foregoing general description and the following detailed description are exemplary and explanatory and are intended to provide further explanation of the novel aspects of the technology as claimed.

Cation Energy Storage Device and Methods

This disclosure is directed to achieving the aforementioned unmet needs with a cation energy storage composition that is made from sustainable elements and is characterized by a capacity that is similar to traditional Lithium-ion (Li-ion) batteries.

Sodium-ion (Na-ion) batteries hold promise as an enabling technology for large-scale energy storage that is safer, less expensive, and have a much smaller environmental impact than their equivalent Li-ion batteries. As described herein, an alluaudite phase of $A_xT_y(PO4)_z$; $Na_xT_y(PO4)_z$; $Na_{1.702}Fe_3(PO4)_3$ and $Na_{0.872}Fe_3(PO4)_3$, can be utilized as new Na-ion battery cathode materials. These alluaudite compositions are described including the hydrothermal synthesis, crystal structure, and electrochemical properties. In at least some of the alluaudite compositions, A is selected from a group consisting of Li, Na, Mg, Ca and combinations thereof. Additionally, T is selected from a group consisting of Fe, Mn, Co, Ni, Al, Sn and combinations thereof. After ball milling and carbon coating, the compositions described herein demonstrate a reversible capacity, such as about 140.7 mAh/g. In addition, these compositions exhibit good cycling performance (93% of the initial capacity is retained after 50 cycles) and excellent rate capability. These alluaudite compounds represent a new cathode material for large-scale battery applications that are earth-abundant and sustainable.

BRIEF DESCRIPTION OF THE DRAWINGS

FIG. 1 is an illustration comparing lithium and sodium.

FIG. 12 is an illustration of one example embodiment of a ball milling process.

FIG. 13 is SEM image of ball-milled energy storage composition.

DEFINITIONS

As used herein, the term "energy storage composition" defines a cation composition for energy storage.

As used herein, the term "cathode material" defines a cation composition used as a precursor-material or material for the making of a cathode.

As used herein, the term "about" defines 10% variation of the value defined.

As used herein, the term composition describes an aggregate chemical substance formed from the interaction of at least two chemical compounds.

DETAILED DESCRIPTION

Figure 2:
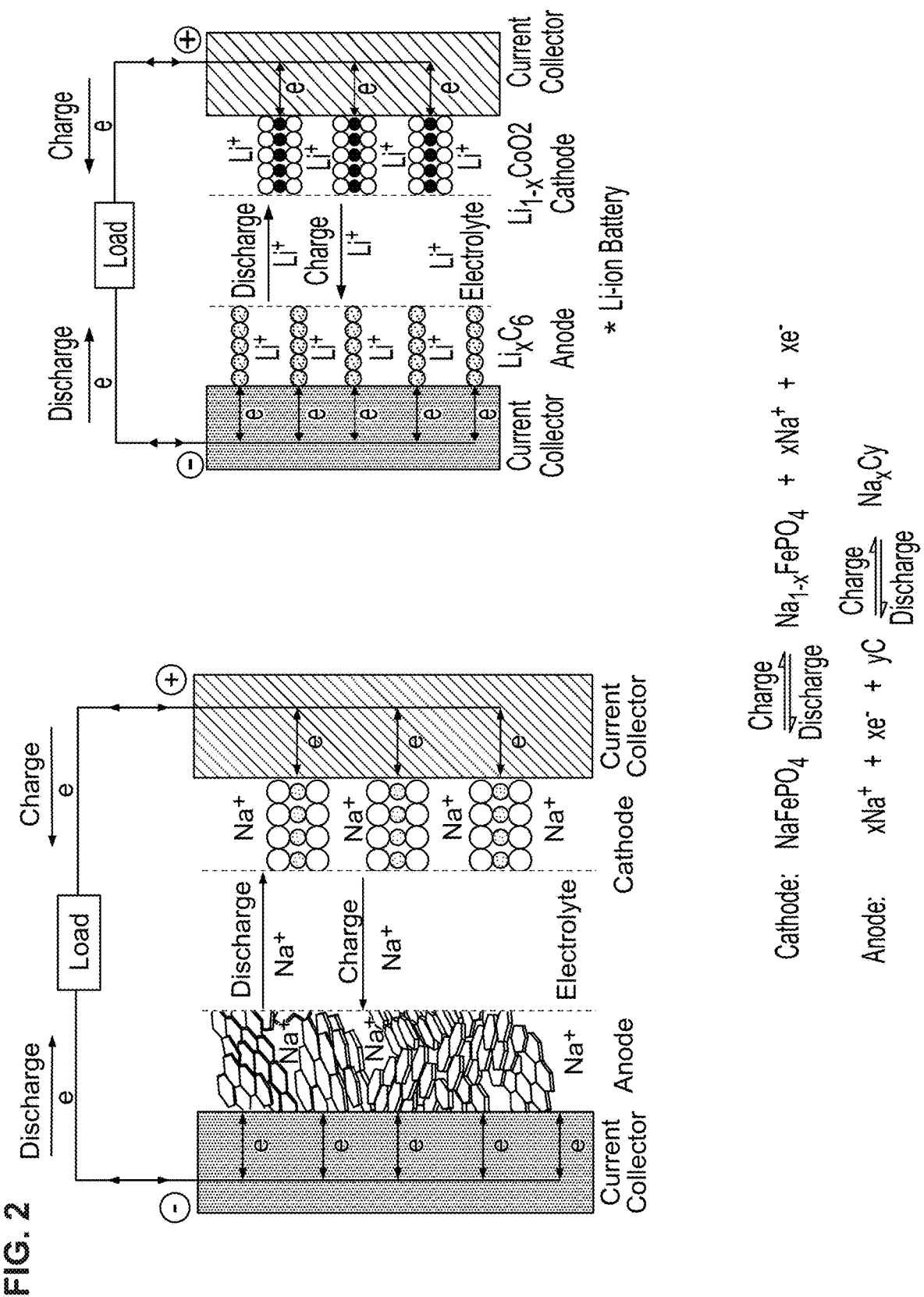
FIG. 2 is an illustration of sodium and lithium batteries.

Sodium-ion (Na-ion) batteries hold promise as an enabling technology for large-scale energy storage that is safer, less expensive, and lower in terms of environmental impact than their equivalent Lithium-ion (Li-ion) batteries. FIG. 1 shows a comparison of Li and Na. Specifically, FIG. 1, compares the atomic weight, cation radius, standard electrode potential, terrestrial reserve, cost and minerals. It is important to note that there are many more known sodium compounds than lithium compounds. That means there are more choices for electrode and electrolyte materials in the Na system. FIG. 2 describes a Na-ion and Li-ion battery arrangement. As shown, current collector is metal foil, in this case Aluminum (Al) is used to ensure maximum current efficiency. The main purpose for the electrode materials is that they should be able to achieve insertion and extraction of Na+. Thus, in these particular embodiments, channeled structure or layered structures are preferred. One of ordinary skill in the art should appreciate that the Na-ion battery is similar to Li-ion battery, with several differences. One difference is the charge carrier is Na+ instead of Li+. Also, graphite cannot be used as the anode material in a Na-ion battery and the cathode materials are also different.

Figure 3:
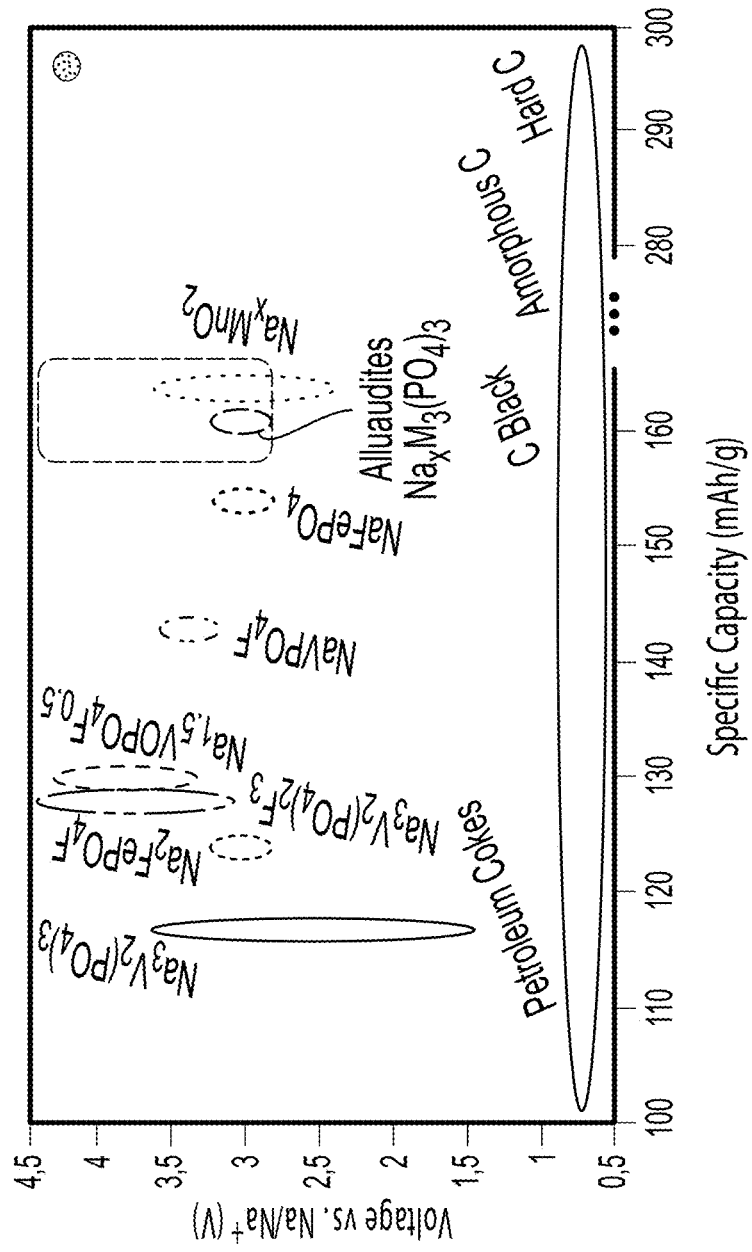
FIG. 3 depicts phosphate based compounds with thermal and chemical stability.

FIG. 3 illustrates the various electrode materials. In particular, different materials that have been tested for Na-ion battery. These materials that have low voltage are used for anode material. For example, Hard C has 300 mAh/g, which is a very good electrode material. Phosphate materials are also good electrode materials because of their thermal and chemical stability.

Energy Storage Composition and Cathode Material

As described herein, an alluaudite phase of $A_xT_y(PO4)_z$; $Na_xT_y(PO4)_z$; $Na_{1.702}Fe_3(PO4)_3$ and $Na_{0.872}Fe_3(PO4)_3$, can be utilized as new Na-ion battery cathode materials. These alluaudite compositions are described including the hydrothermal synthesis, crystal structure, and electrochemical properties. In at least some of the alluaudite compositions, A is selected from a group consisting of Li, Na, Mg, Ca and combinations thereof. Additionally, T is selected from a group consisting of Fe, Mn, Co, Ni, Al, Sn and combinations thereof. After ball milling and carbon coating, the compositions described herein demonstrate a reversible capacity, such as about 140.7 mAh/g. In addition these compositions exhibit good cycling performance (93% of the initial capacity is retained after 50 cycles) and excellent rate capability. These alluaudite compounds represent a new cathode material for large-scale battery applications that are earth-abundant and sustainable.

Sodium-ion batteries are very promising for large-scale storage applications. Covalent polyanionic compounds based on earth-abundant metals have been studied in recent years in the search for new cathode materials for Na-ion batteries. As described herein, a new Na-ion battery cathode material, an alluaudite phase of $A_xT_y(PO4)_z$, $Na_xT_y(PO4)_z$, $Na_{1.702}Fe_3(PO4)_3$ and $Na_{0.872}Fe_3(PO4)_3$, is described including the hydrothermal synthesis, crystal structure, and electrochemical properties. Among these compounds, alluaudite phases with the chemical formula, $Na_xT_y(PO4)_z$, where T sites are occupied by Fe, Mn, Co, Ni, Al, Sn and combinations thereof, are advantageous in their specific embodiments because of their channeled structures, high theoretical capacity (160 mAh/g), and good thermal stability. Specifically, the alluaudite $Na_{1.702}Fe_3(PO_4)_3$, and $Na_{0.872}Fe_3(PO_4)_3$, as described in more detail below, exhibit good thermal stability and capacity when made via a hydrothermal synthesis.

In one example embodiment, an energy storage composition comprises the formula: $A_xT_y(PO_4)_z$. In at least one example embodiment, the energy storage composition of where A is selected from a group consisting of Li, Na, Mg, Ca and combinations thereof. In related embodiments, T is selected from a group consisting of Fe, Mn, Co, Ni, Al, Sn and combinations thereof. It should be appreciated that in certain embodiments of the energy storage composition, x is a number greater than or equal to 0 and less than or equal to 3. In other related embodiments, y is at least 3 or greater than or equal to 1 and less than or equal to 3.5 and z is greater than or equal to 1 and less than or equal to 3. Optionally, energy storage composition is coated with carbon, a carbon-based material and combinations thereof. In embodiments that utilize a carbon based material, these materials are selected from a group consisting of polymers, graphite powders, oligomers, graphene sheets, citric acid, ascorbic acid, glucose, sucrose, cellulose, carbohydrates and combinations thereof. In other related embodiments, the maximum capacity of the composition is about 160 mAh/g; delivers a reversible capacity of about 46 mAh/g to about 65 mAh/g or 65 mAh/g to about 100 mAh/g or about 120 mAh/g to about 160 mAh/g.

In one example embodiment, an energy storage composition comprises the formula: $Na_xT_y(PO_4)_z$. In related embodiments, T is selected from a group consisting of Fe, Mn, Co, Ni, Al, Sn and combinations thereof. It should be appreciated that in certain embodiments of the energy storage composition, x is a number greater than or equal to 0 and less than or equal to 3. In other related embodiments x is a number greater than or equal to 0.872 and less than or equal to 1.702. In other related embodiments, y is at least 3 or greater than or equal to 1 and less than or equal to 3.5 and z is greater than or equal to 1 and less than or equal to 3. Optionally, energy storage composition is coated with carbon, a carbon-based material and combinations thereof. In embodiments that utilize a carbon based material, these materials are selected from a group consisting of polymers, graphite powders, oligomers, graphene sheets, citric acid, ascorbic acid, glucose, sucrose, cellulose, carbohydrates and combinations thereof. In other related embodiments the maximum capacity of the composition is about 160 mAh/g; delivers a reversible capacity of about 46 mAh/g to about 65 mAh/g or 65 mAh/g to about 100 mAh/g or about 120 mAh/g to about 160 mAh/g.

In one example embodiment, an energy storage composition comprises the formula: $Na_{1.702}Fe_y(PO_4)_z$. In other related embodiments, y is at least 3 or greater than or equal to 1 and less than or equal to 3.5 and z is greater than or equal to 1 and less than or equal to 3. In at least one example embodiment, the energy storage composition comprises the formula $Na_{1.702}Fe_3(PO_4)_3$. Optionally, energy storage composition is coated with carbon, a carbon-based material and combinations thereof. In embodiments that utilize a carbon based material, these materials are selected from a group consisting of polymers, graphite powders, oligomers, graphene sheets, citric acid, ascorbic acid, glucose, sucrose, cellulose, carbohydrates and combinations thereof. In other related embodiments the maximum capacity of the composition is about 160 mAh/g; delivers a reversible capacity of about 46 mAh/g to about 65 mAh/g or 65 mAh/g to about 100 mAh/g or about 120 mAh/g to about 160 mAh/g.

In one example embodiment, a cathode material comprises the formula: $Na_{1.702}Fe_y(PO_4)_z$. In other related embodiments, y is at least 3 or greater than or equal to 1 and less than or equal to 3.5 and z is greater than or equal to 1 and less than or equal to 3. In at least one example embodiment, the cathode material comprises the formula $Na_{1.702}Fe_3(PO_4)_3$. Optionally, the cathode material is coated with carbon, a carbon-based material and combinations thereof. In embodiments that utilize a carbon based material, these materials are selected from a group consisting of polymers, graphite powders, oligomers, graphene sheets, citric acid, ascorbic acid, glucose, sucrose, cellulose, carbohydrates and combinations thereof. In other related embodiments the maximum capacity of the composition is about 160 mAh/g; delivers a reversible capacity of about 46 mAh/g to about 65 mAh/g or 65 mAh/g to about 100 mAh/g or about 120 mAh/g to about 160 mAh/g.

In one example embodiment, an energy storage composition comprises the formula: $Na_{0.872}Fe_y(PO_4)_z$. In other related embodiments, y is at least 3 or greater than or equal to 1 and less than or equal to 3.5 and z is greater than or equal to 1 and less than or equal to 3. In at least one example embodiment, the energy storage composition comprises the formula $Na_{0.872}Fe_3(PO_4)_3$. Optionally, energy storage composition is coated with carbon, a carbon-based material and combinations thereof. In embodiments that utilize a carbon based material, these materials are selected from a group consisting of polymers, graphite powders, oligomers, graphene sheets, citric acid, ascorbic acid, glucose, sucrose, cellulose, carbohydrates and combinations thereof. In other related embodiments the maximum capacity of the composition is about 160 mAh/g; delivers a reversible capacity of about 46 mAh/g to about 65 mAh/g or 65 mAh/g to about 100 mAh/g or about 120 mAh/g to about 160 mAh/g.

In one example embodiment, a cathode material comprises the formula: $Na_{0.872}Fe_y(PO_4)_z$. In other related embodiments, y is at least 3 or greater than or equal to 1 and less than or equal to 3.5 and z is greater than or equal to 1 and less than or equal to 3. In at least one example embodiment, the cathode material comprises the formula $Na_{0.872}Fe_3(PO_4)_3$. Optionally, the cathode material is coated with carbon, a carbon-based material and combinations thereof. In embodiments that utilize a carbon based material, these materials are selected from a group consisting of polymers, graphite powders, oligomers, graphene sheets, citric acid, ascorbic acid, glucose, sucrose, cellulose, carbohydrates and combinations thereof. In other related embodiments the maximum capacity of the composition is about 160 mAh/g; delivers a reversible capacity of about 46 mAh/g to about 65 mAh/g or 65 mAh/g to about 100 mAh/g or about 120 mAh/g to about 160 mAh/g.

Figure 4:
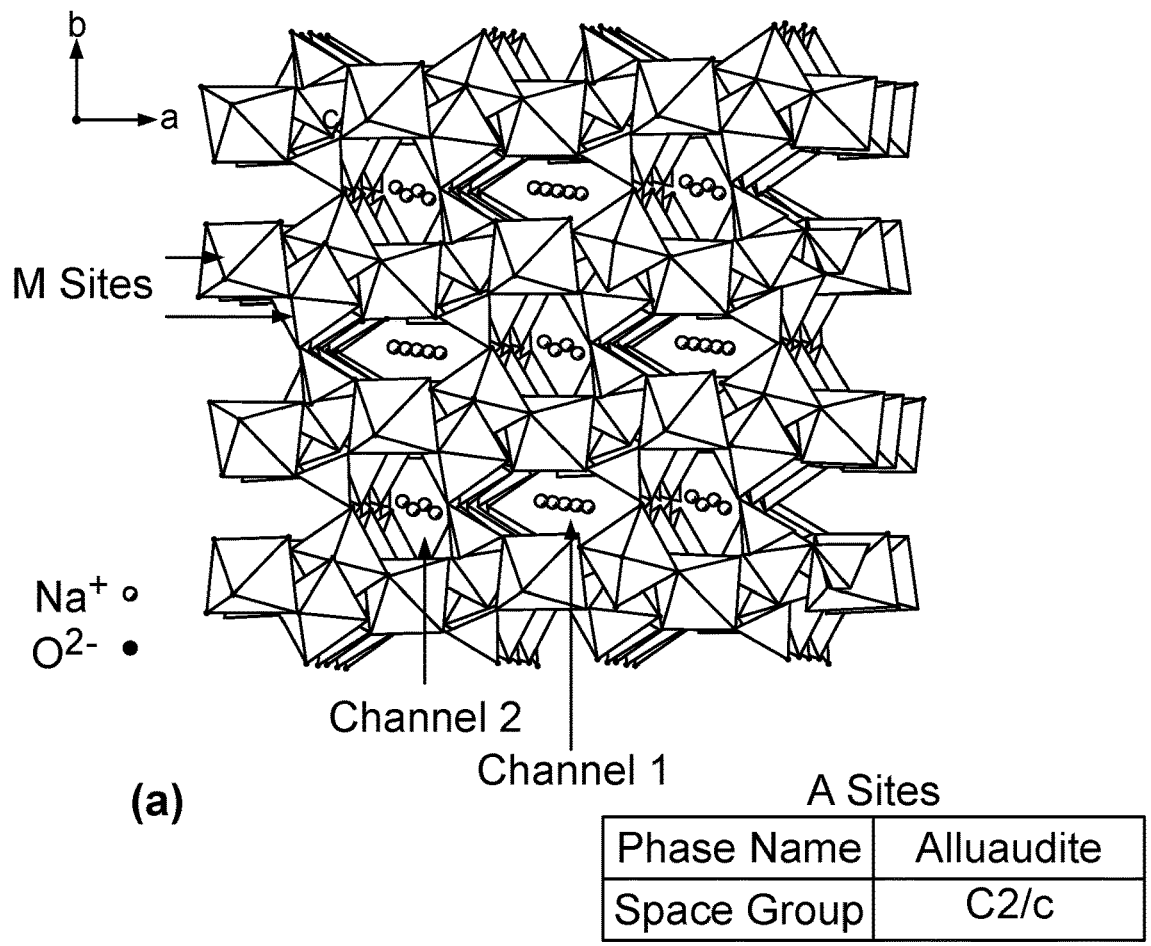
FIG. 4 is an illustration of an (a) alluaudite structure and (b) a charge/discharge reaction with the chemical formula $Na_xFe_3(PO_4)_3$.
Figure 4:
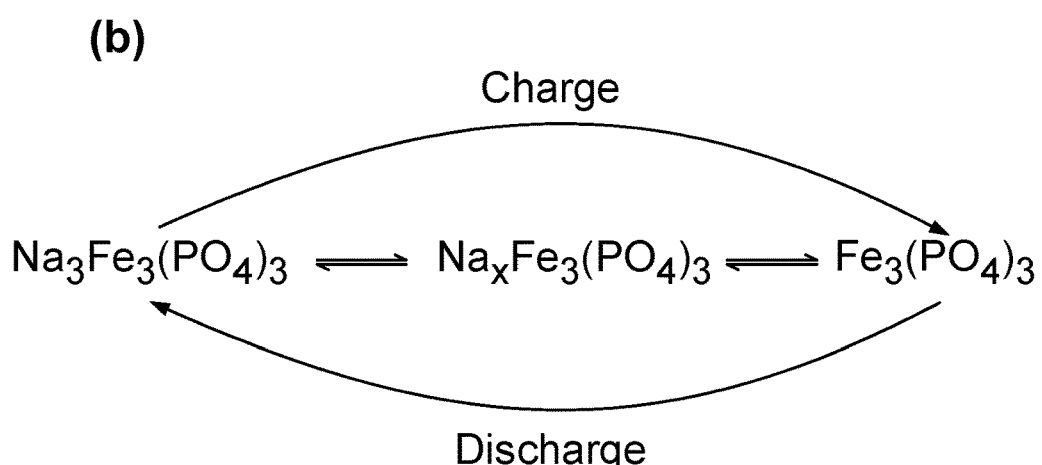

FIG. 4a and FIG. 4b illustrate one example embodiment of energy storage composition. In at least this example embodiment, the alluaudite composition $Na_{1.702}Fe_3(PO_4)_3$ crystallizes in the monoclinic C 2/c space group. The crystal structure of $Na_{1.702}Fe_3(PO_4)_3$ can be described as a framework consisting of Fe octahedra with bridging phosphate tetrahedral. In at least this example embodiment the theoretical capacity of $Na_{1.702}Fe_3(PO_4)_3$ is 163.3 mAh/g.

Figure 6A:
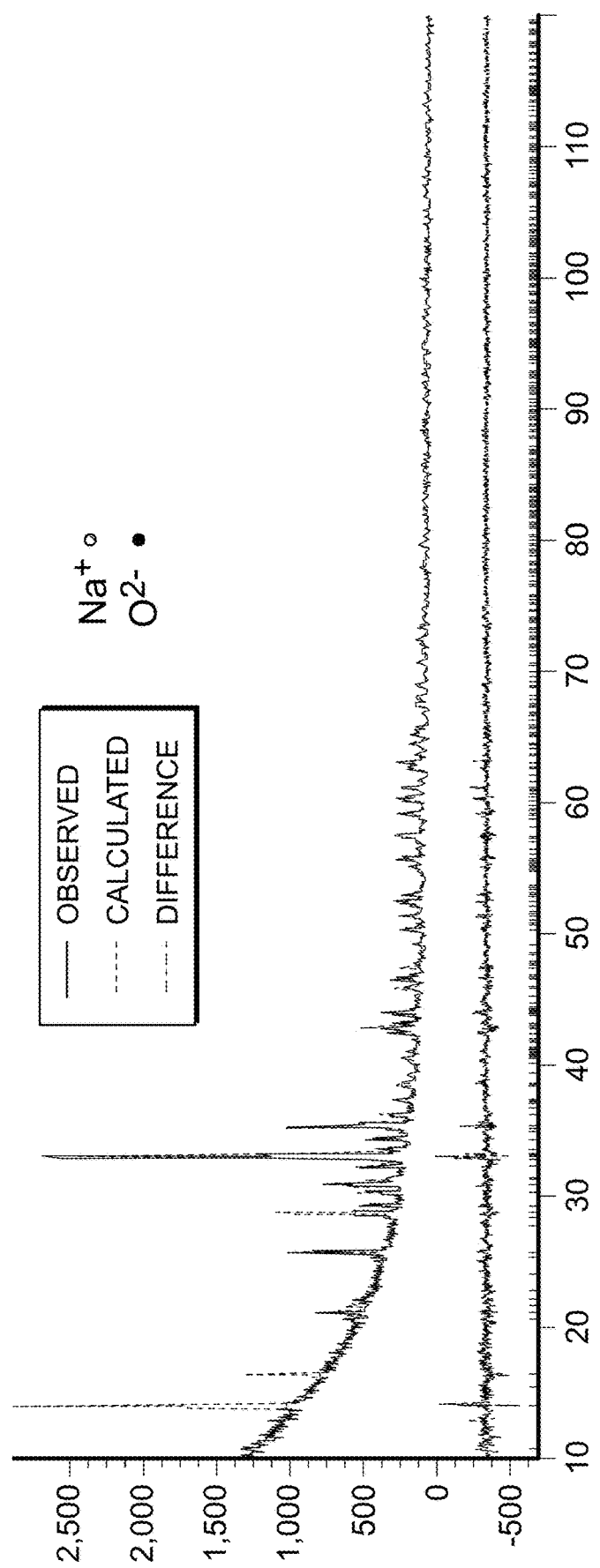
FIG. 6a is a graphical representation of X-ray Diffraction (XRD) pattern and Rietveld refinement of $Na_{1.702}Fe_3(PO_4)_3$
Figure 6B:
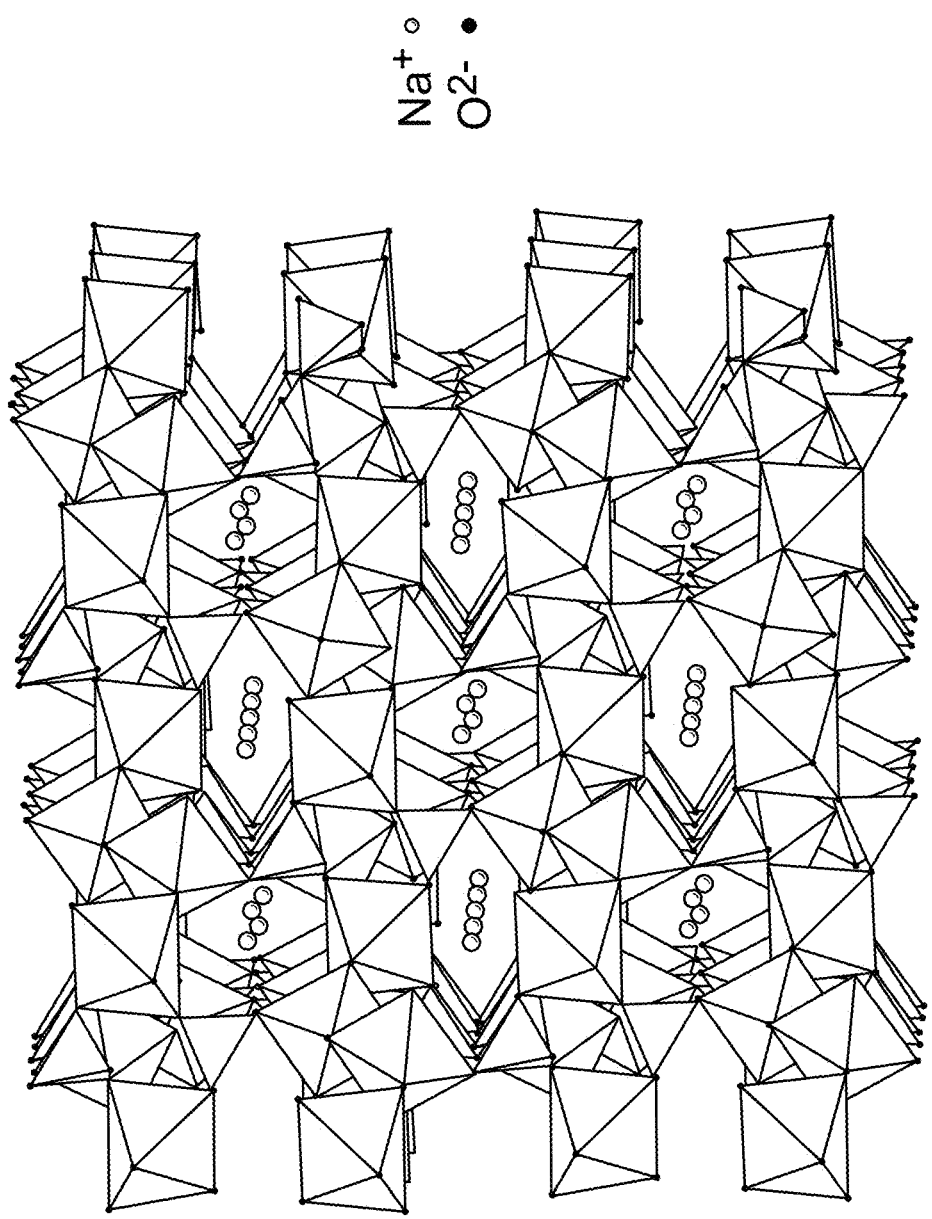
FIG. 6b is an illustration of the structure of alluaudite, where $Fe^{2+}$ and $Fe^{3+}$ ions are represented octahedra and $PO^{4-}$ ions are represented as tetrahedral.

FIG. 6 illustrates an energy storage composition comprising an alluaudite compound. In one particular embodiment, $Na_{1.702}Fe_3(PO_4)_3$. In at least this example embodiment, $Na_{1.702}Fe_3(PO_4)_3$ crystallizes in the monoclinic C 2/c space group. The X-ray Diffraction (XRD) pattern of an annealed sample indicates that pure alluaudite $Na_{1.702}Fe_3(PO_4)_3$ was obtained (see FIG. 6a). As shown in FIG. 6b and Tables 1 and 2, below, data based on the Reitveld refinement of the XRD, the crystal structure of $Na_{1.702}Fe_3(PO_4)_3$ is described as a framework consisting of Fe octahedral with bridging phosphate tetrahedral. Two different channels are present in the crystal lattice where sodium ions can reside. These channels are parallel to the c-axis.

Figure 7:
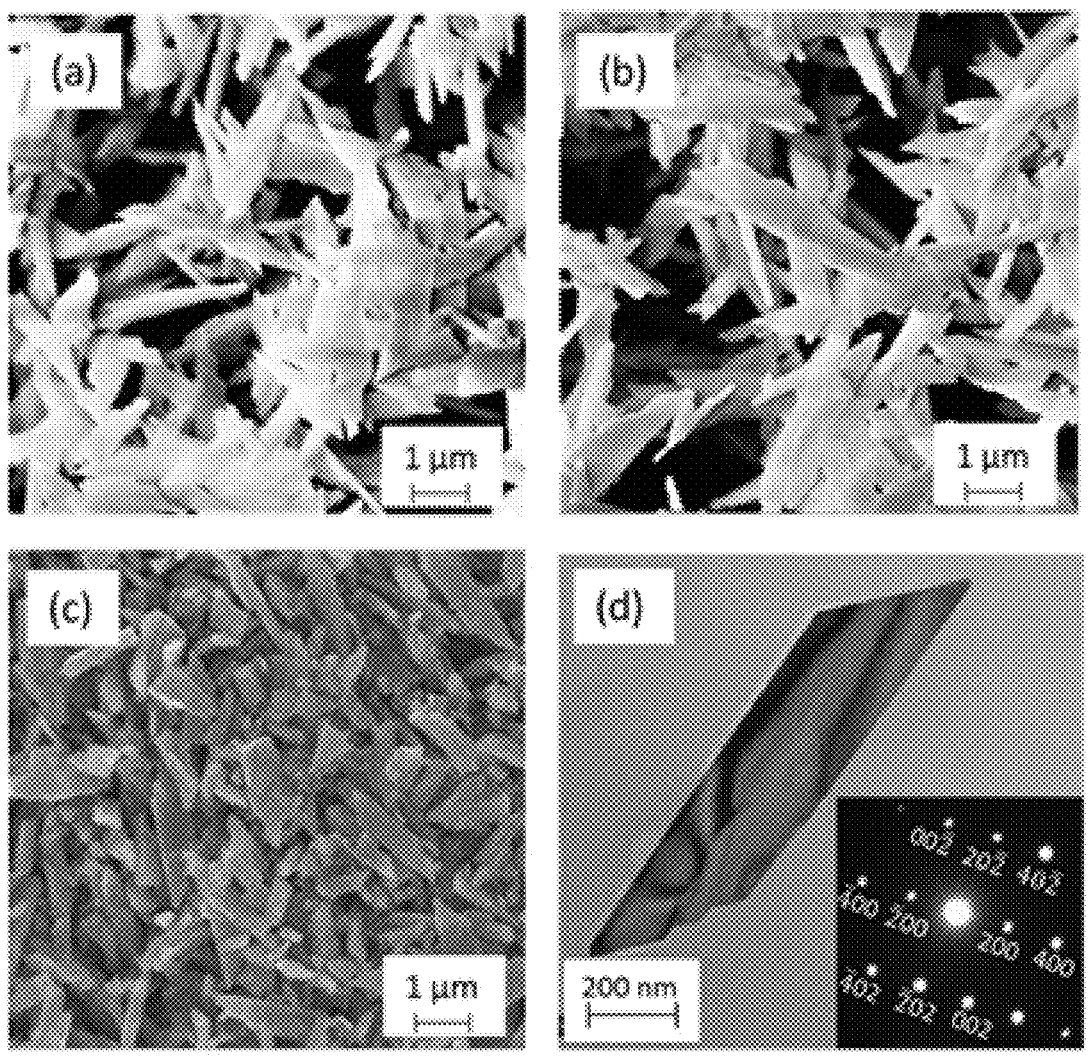
FIG. 7 depicts SEM micrographs showing the morphology and particle size of (a) as-synthesized composition, (b) annealed composition, and (c) carbon-coated composition and (d) TEM image of an as-synthesized nanoplate of the composition.

FIGS. 7a-c, illustrate SEM images of three samples of $Na_{1.702}Fe_3(PO_4)_3$. In this particular embodiment, the energy storage composition is shown as-synthesized, annealed, and carbon coated, respectively. Hydrothermal reaction provides unique morphologies by careful control of synthesis parameters, such as concentration, pH and temperature. The product contains micro plates with a length of about 2 μm and a width of about 300 nm. Optionally, annealing can be used to remove defects and impurity. On average, the length and width of the nanoplate is 2 μm and 200 nm.

TABLE 1

Lattice parameters of $Na_{1.702}Fe_3(PO_4)_3$ obtained by Rietveld refinement of XRD data.

| Phase | Alluaudite |
|---|---|
| Space | C 2/c |
| Lattice Parameters | |
| a (Å) | 11.87458(48) |
| b (Å) | 12.54469(50) |
| c (Å) | 6.48458(23) |
| Beta (°) | 114.7536(28) |

Figure 8:
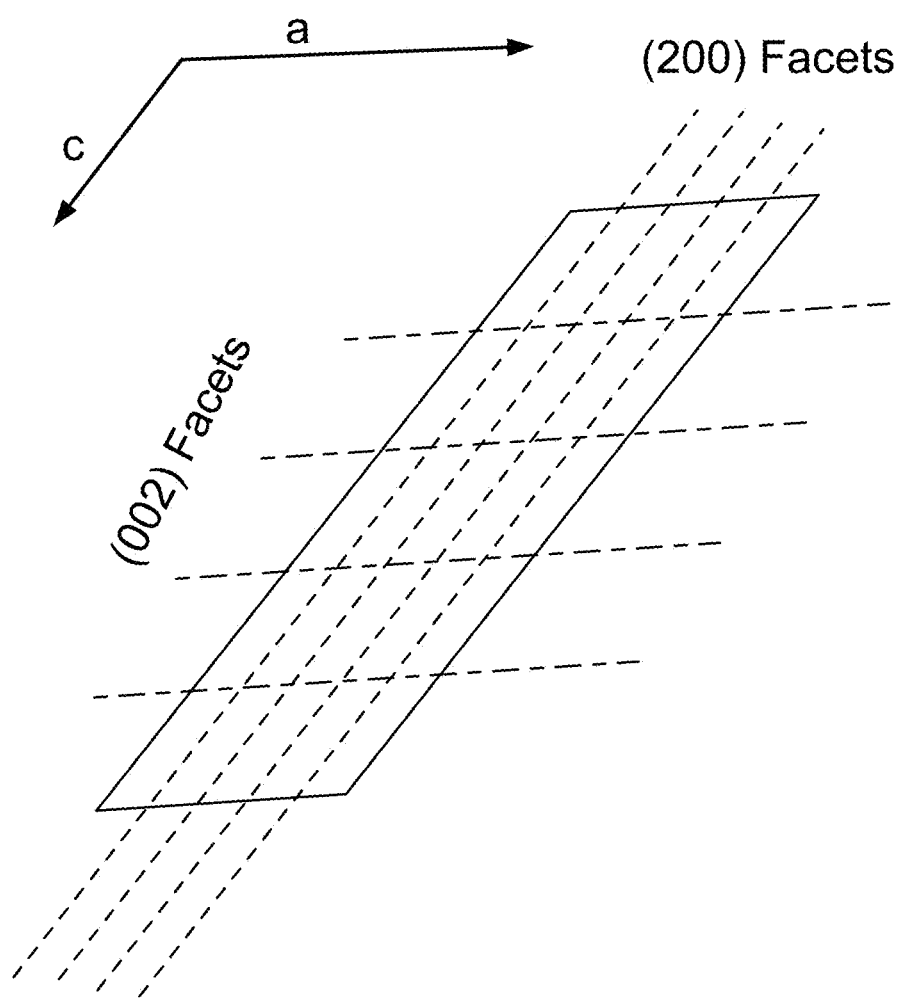
FIG. 8 is an illustration of larger contact between electrode and electrolyte.

The carbon content of the carbon-coated sample is shown having 5 wt % as measured by a Carbon-Nitrogen Elemental Analyzer (CE Instruments Model NC2100). FIG. 3d is a TEM image of an individual nanoplate of $Na_{1.702}Fe_3(PO_4)_3$. The crystalline nature of the as-synthesized $Na_{1.702}Fe_3(PO_4)_3$ is confirmed by the Selected Area Electron Diffraction (SAED) pattern (inset), which is indexed to the monoclinic crystal structure along the [010] zone axis. In at least this example embodiment, the energy storage composition comprises a b-axis that is perpendicular to the major facet shown, with the a-axis and c-axis corresponding to the short and long edge of the crystalline nanoplate. FIG. 8 illustrates a larger contact area greater than or equal to the electrode and electrolyte. Additionally, the energy storage composition described herein may also have a higher stress tolerance upon ion (de)intercalation.

Figure 9:
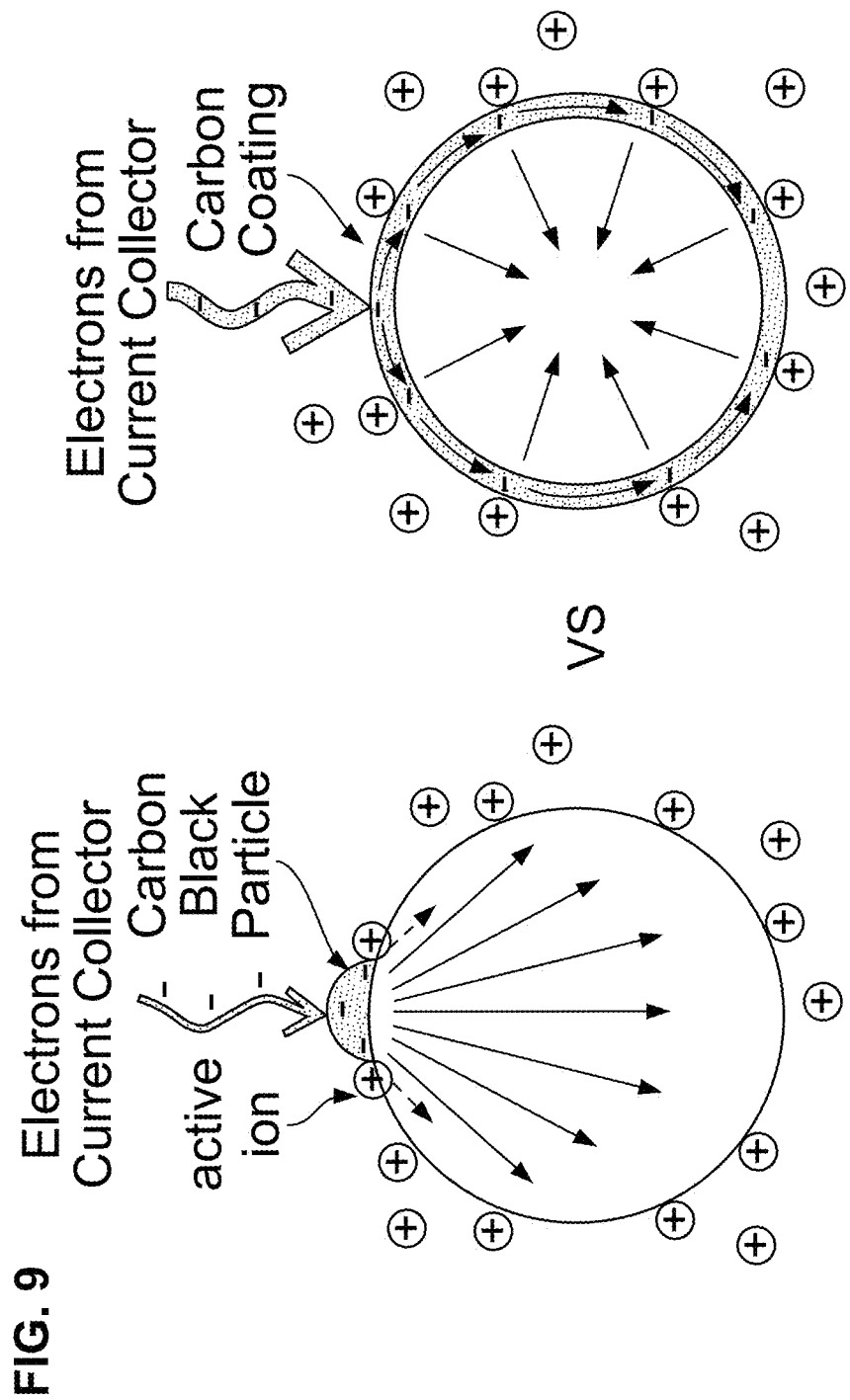
FIG. 9 is an illustration of one embodiment of the carbon coating process.

FIG. 9 illustrates an example embodiment of a carbon coating process. Phosphate based materials typically exhibit low electronic conductivity. In this example embodiment, the carbon coating is used to improve the electrochemical performance of the cathode material and/or energy storage composition.

TABLE 2

Atomic coordinates and site occupancies of $Na_{1.702}Fe_3(PO_4)_3$.

| Site | Np | x | y | z | Atom | Occ | Beq |
|---|---|---|---|---|---|---|---|
| Na1 | 4 | 0.00000 | −0.0095(19) | 0.25000 | Na + 1 | 0.754 | 1.66(55) |
| Na2 | 4 | 0.50000 | 0.00000 | 0.00000 | Na + 1 | 0.948 | 0.27(35) |
| Fe1 | 4 | 0.00000 | 0.26450(57) | 0.25000 | Fe | 1 | 0.62(19) |
| Fe2 | 8 | 0.28423(57) | 0.65817(45) | 0.3689(11) | Fe | 1 | 1.63(15) |
| P1 | 4 | 0.00000 | −0.2890(11) | 0.25000 | P | 1 | 2.04(37) |
| P2 | 8 | 0.23974(97) | −0.11294(72) | 0.1376(19) | P | 1 | 2.74(31) |
| O1 | 8 | 0.4565(19) | 0.7275(20) | 0.5214(39) | O-2 | 1 | 7.18(88) |
| O2 | 8 | 0.1055(15) | 0.6419(12) | 0.2289(27) | O-2 | 1 | 0.52(44) |
| O3 | 8 | 0.3354(19) | 0.6587(16) | 0.0722(38) | O-2 | 1 | 5.42(65) |
| O4 | 8 | 0.1249(16) | 0.4037(12) | 0.3446(29) | O-2 | 1 | 2.72(54) |
| O5 | 8 | 0.2182(18) | 0.8349(16) | 0.3505(34) | O-2 | 1 | 4.23(64) |
| O6 | 8 | 0.3386(13) | 0.5036(19) | 0.3868(28) | O-2 | 1 | 4.47(56) |

Figure 10A:
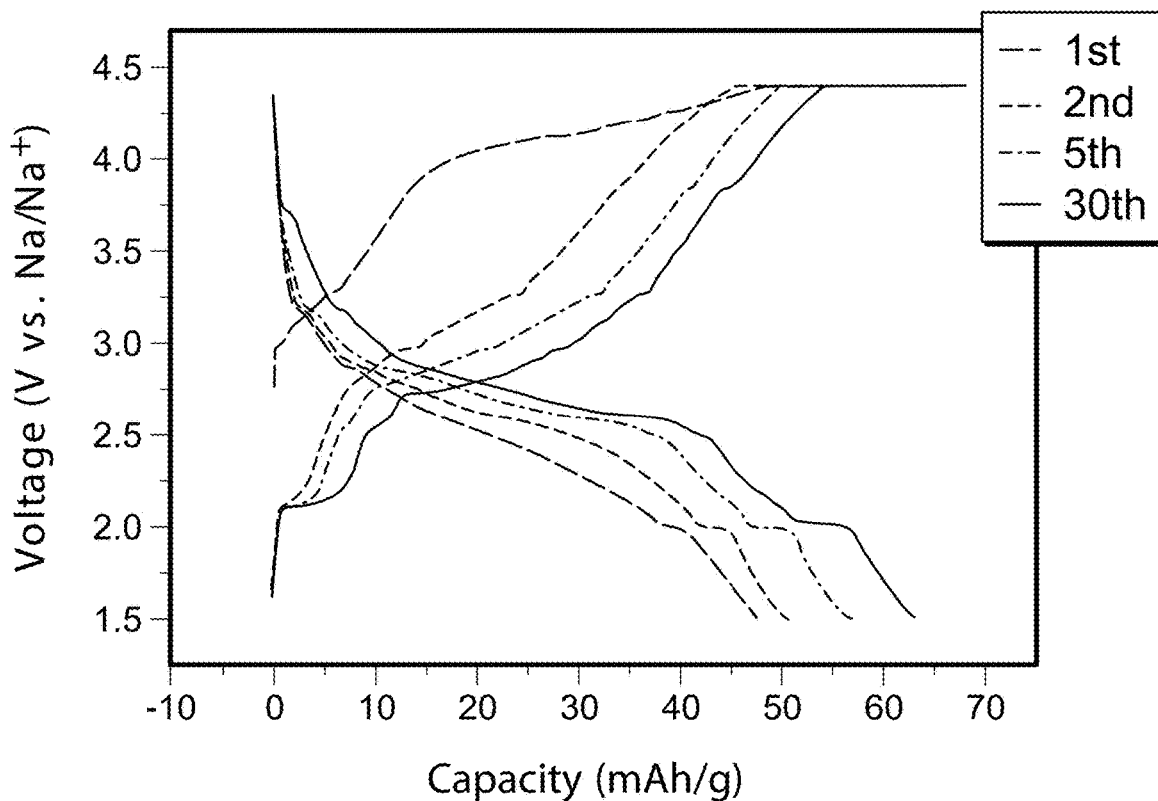
FIG. 10a is a graphical representation of alluaudite sample as cathode material.
Figure 10B:
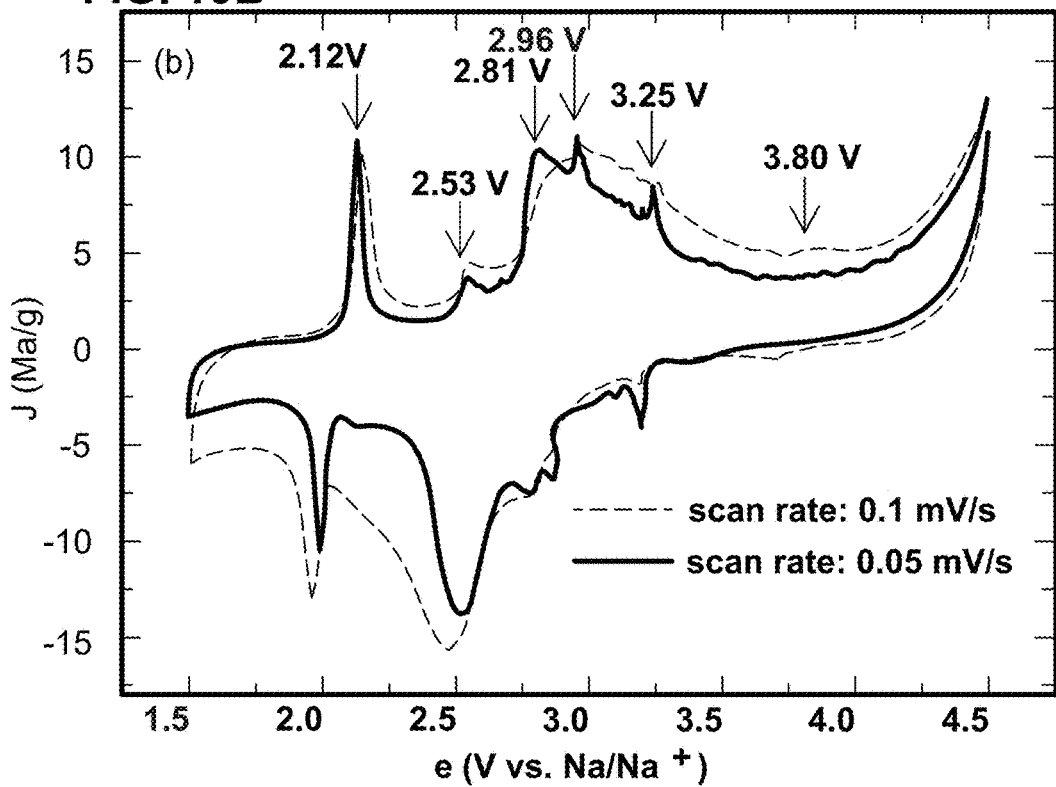
FIG. 10b is a graphical representation of cyclic voltammetry of cathode material.

FIG. 10a illustrates a sample of carbon-coated $Na_{1.702}Fe_3(PO_4)_3$ nanoplates that were used as a cathode material in a coin-cell battery. As graphically shown charging and discharging profiles of a Na-ion battery [Na metal||$Na_{1.702}Fe_3(PO_4)_3$] are graphically illustrated. The sodium-ion battery delivers a capacity of ~60 mAh/g when discharged galvanostatically at room temperature. FIG. 10b, discloses six different plateaus in the voltage-capacity curve, which correspond to peaks in the cyclic voltammetry. These peaks appear at six different potentials, indicating Na sites at different energy levels are involved in the electrochemical charging and discharging of $Na_{1.702}Fe_3(PO_4)_3$. Broad peaks labelled with black arrows in FIG. 10b at 2.53 V, 2.81 V and 3.80 V suggest that single-phase reactions take place. Conversely, sharp peaks labelled with black arrows in FIG. 10b at 2.12 V, 2.96 V, and 3.25 V are characteristic of two-phase reactions. CV data obtained at higher scan rate (dashed line in FIG. 10b) reveal broad peaks at 2.53 V, 2.81 V and 3.80 V. CV data obtained at a lower scan rate (solid line in FIG. 10b) reveals the sharp peaks at 2.12 V, 2.96 V, and 3.25 V more clearly. These results indicate that both single-phase reactions and biphasic transitions occur in $Na_{1.702}Fe_3(PO_4)_3$ when cycled in a Na-ion battery.

Figure 11:
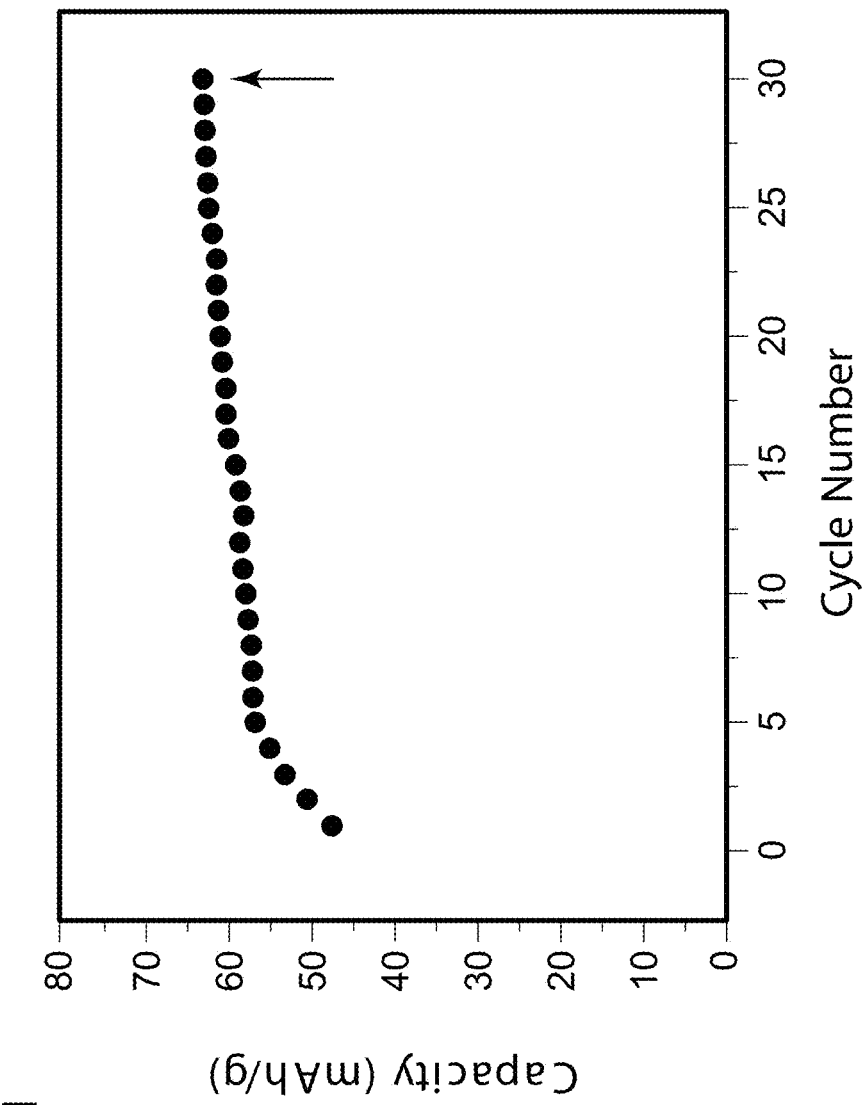
FIG. 11 is a graphical representation of discharge capacity of energy storage composition over 30 cycles.

FIG. 11 illustrates the discharging capacity obtained at the 30th cycle (63.1 mAh/g), as shown in FIG. 11, is much lower than the theoretical capacity (160 mAh/g). At least in FIG. 11, three Na ions are assumed to be electroactive per formula unit if the material is cycled between the two end states: $Fe^{III}(PO_4)_3$ and $Na_3Fe^{II}(PO_4)_3$.

Chemical oxidation of the as-synthesized $Na_{1.702}Fe_3(PO_4)_3$ was performed using nitronium tetrafluoroborate ($NO_2BF_4$), which is a strong oxidizer (the potential of the $NO^{2+}/NO_2$ redox couple is 4.5 V vs. $Na^+/Na$). An XRD pattern of the chemically de-sodiated material was measured and Rietveld refined to reveal another energy storage composition in the alluaudite class, $Na_{0.872}Fe_3(PO_4)_3$. Refinement of the occupancy factors of the Na sites indicates that occupancy of Na(1) and Na(2) sites was reduced to 0 and 0.872, respectively (see Tables 3 and 4).

A comparison of the structures of $Na_{0.872}Fe_3(PO_4)_3$ and $Na_{1.702}Fe_3(PO_4)_3$ reveals that all Na ions (0.754 Na ions per formula unit) that occupy the Na(1) site in channel 2 are extracted at potentials <4.5V vs. $Na^+/Na$, while only a small portion of Na ions (0.076 Na ions) that occupy the Na(2) site in channel 1 can be extracted at these potentials. This result can be explained by the difference in size of the two channels: channel 1 is slightly smaller than channel 2 (the shortest Na—O bond in channel 1 is shorter than in channel 2 by about 6.3%) and therefore, more energy is required to extract all Na ions from the Na(2) sites in channel 1.

The thermal stability of pristine $Na_{1.702}Fe_3(PO_4)_3$ was tested by in situ temperature-dependent XRD between room temperature and 500° C. It exhibits excellent thermal stability as indicated by the absence of any change in the XRD at all temperatures tested (50° C., 100° C., 200° C., 300° C., 400° C. and 500° C.).

TABLE 3

Lattice parameters of $Na_{0.872}Fe_3(PO_4)_3$.

| Phase | Alluaudite |
|---|---|
| Space | C 2/c |
| Lattice Parameters | |
| a (Å) | 11.8532(14) |
| b (Å) | 12.5054(3) |
| c (Å) | 6.40155(58) |
| Beta (°) | 114.425(12) |

TABLE 4

Atomic coordinates and site occupancies of $Na_{0.872}Fe_3(PO_4)_3$.

| Site | Np | x | y | z | Atom | Occ |
|---|---|---|---|---|---|---|
| Na1 | 4 | 0.00000 | −0.01170 | 0.25000 | Na + 1 | 0 |
| Na2 | 4 | 0.50000 | 0.00000 | 0.00000 | Na + 1 | 0.872 |
| Fe1 | 4 | 0.00000 | 0.25793 | 0.25000 | Fe | 1 |
| Fe2 | 8 | 0.26824 | 0.64630 | 0.34254 | Fe | 1 |
| P1 | 4 | 0.00000 | −0.31044 | 0.25000 | P | 1 |
| P2 | 8 | 0.24002 | −0.13254 | 0.15841 | P | 1 |
| O1 | 8 | 0.44369 | 0.72210 | 0.49623 | O-2 | 1 |
| O2 | 8 | 0.07479 | 0.71801 | 0.13809 | O-2 | 1 |
| O3 | 8 | 0.31627 | 0.69215 | 0.06666 | O-2 | 1 |
| O4 | 8 | 0.10103 | 0.37222 | 0.26679 | O-2 | 1 |
| O5 | 8 | 0.24107 | 0.84124 | 0.40714 | O-2 | 1 |
| O6 | 8 | 0.32335 | 0.50200 | 0.39185 | O-2 | 1 |

Method of Making

The methods disclosed herein describe a novel synthesis that includes ball-milled, carbon-coated and carbon coated/ball milled processes for creating an energy storage composition for stationary power sources. The methods described herein also describe a novel synthesis that includes ball-milled and carbon-coated processes for creating a cathode material for Na-ion batteries. These materials exhibit high reversible capacity, high voltage, excellent rate capability, good cycling characteristics, and thermal stability—characteristics that are necessary for large-scale batteries based on earth-abundant materials.

Figure 5:
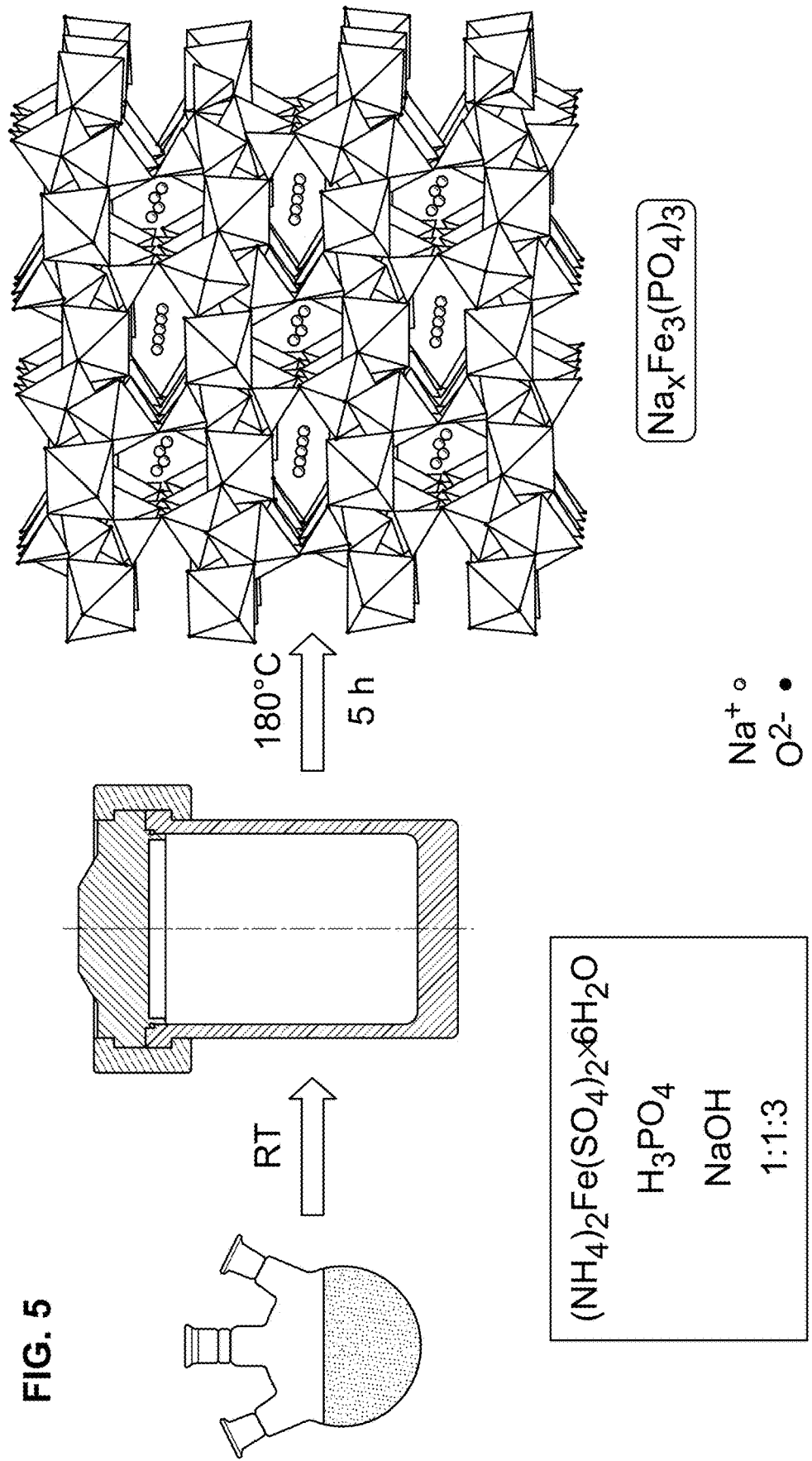
FIG. 5 is an illustration of one example of hydrothermal synthesis of $Na_xFe_3(PO_4)_3$.

In at least one example embodiment, $Na_{1.702}Fe_3(PO_4)_3$ was prepared via hydrothermal synthesis. FIG. 5 where starting materials were $(NH_4)_2Fe(SO_4)_2.6H_2O$ (Aldrich, St. Louis, Mo.), $H_3PO_4$ (Fisher Scientific, Waltham, Mass.), and NaOH (Aldrich, St. Louis, Mo.). Reactants were dissolved in water with a 1:1:3 molar ratio and subsequently transferred to a Parr autoclave, which was sealed and heated at 180° C. for 6 hours. After cooling to room temperature, the reaction was filtered of precipitated product. In at least this example embodiment, the product was dried to yield a fine powder with a greenish grey color. In related embodiments, an SPEX 8000D MIXER/Mill® (SPEX SamplePrep, Metuchen, N.J.) is optionally used to ball-mill as-synthesized samples of $Na_{1.702}Fe_3(PO_4)_3$.

In order to optionally carbon coat an energy storage composition, a dried powder of $Na_{1.702}Fe_3(PO_4)_3$ was added to a small amount of ethanol that contained 80 wt % of citric acid (Aldrich). This mixture was sonicated to wet the powder completely with citric acid solution and subsequently heated at 600° C. under Ar for 5 hours to deposit a carbon coating. A control sample was prepared by annealing the $Na_{1.702}Fe_3(PO_4)_3$ powder in the absence of citric acid at 600° C. under flowing Ar for 5 hours.

In one example embodiment, a method of coating an energy storage composition or cathode material comprises the steps of combining a dried powder of an energy storage composition with a solution and heating the mixture of energy storage composition and solution. In related embodiments the solution is selected from the group consisting of citric acid, glucose, lithium citrate, sodium citrate, carbon based monomers and carbon based polymers. In related examples the energy storage composition is heated at temperature parameters comprising 600° C. or greater, 500° C. or greater, 400° C. or greater, 300° C. or greater, 200° C. or greater, or no greater than 750° C. In other aspects of the method of coating the energy storage composition is heated for at least 1 hour or at least 5 hours. The energy storage composition is exposed to a gas selected from a group consisting of Argon and Nitrogen.

In related methods, the carbon coated energy storage composition is optionally exposed to ball milling. In embodiments where ball milling is performed the composition undergoes high energy tumbling of energy storage compound for at least 15 minutes, at least 1 hour, at least 2 hours, at least 3 hours or at least 4 hours. In embodiments where ball milling is employed, at least 90% of the energy storage composition particle size is less than 200 nm. In other related embodiments where ball milling is used, at least 99% of the energy storage composition particle size is less than 200 nm.

Scanning Electron Microscopy (SEM) using a field emission microscope (LEO 1530) operating at 10 kV was used to characterize the morphology of all samples. FEI CM 20—Transmission Electron Microscope (TEM) operating at 200 kV was used for TEM studies. A D8-DISCOVER® (Bruker Corp., Billerica, Mass.) diffractometer (operating at 40 mA, 40 kV) equipped with a Cu-Kα radiation source was used to obtain powder X-ray diffractograms.

Active materials were mixed initially with 20 wt % SUPER P® carbon black (Imerys Graphite (formerly Timcal), Bodio, Switzerland) and a 10 wt % solution of polyvinylidene difluoride (PVDF) in N-methyl-2-pyrrolidone (NMP) to form a slurry. After stirring at room temperature overnight, the slurry was skimmed onto aluminum foil using a doctor blade. Subsequently, samples were dried for 6 h at 110° C. under vacuum. Coin cell batteries were assembled in an inert atmosphere dry box ($[H_2O]<0.1$ ppm, $[O_2]<0.1$ ppm) using thin discs of metallic sodium as the anode, a glass microfiber filter (grade GF/F; Whatman, U.S.) and Celgard 2400 as the separator, and 1 M $NaClO_4$ in propylene carbonate as electrolyte. The batteries were cycled galvanostatically at room temperature.

FIG. 7d (inset) illustrates a crystal of the as-synthesized $Na_{1.702}Fe_3(PO_4)_3$ that was indexed in the TEM diffraction pattern to determine the orientation of the Na ion channels relative to the crystal facets. Indexing revealed the longest edge of the crystal corresponds to the c-axis of $Na_{1.702}Fe_3(PO_4)_3$ alluaudite structure, which is parallel to the Na ion channels. Consequently, the diffusion length for Na ions during charging and discharging is longer than 1 μm, which could explain the poor performance of the material in previous studies. Therefore, material samples are ball-milled to reduce their particle size and thus obtain better electrochemical performance.

Figure 14:
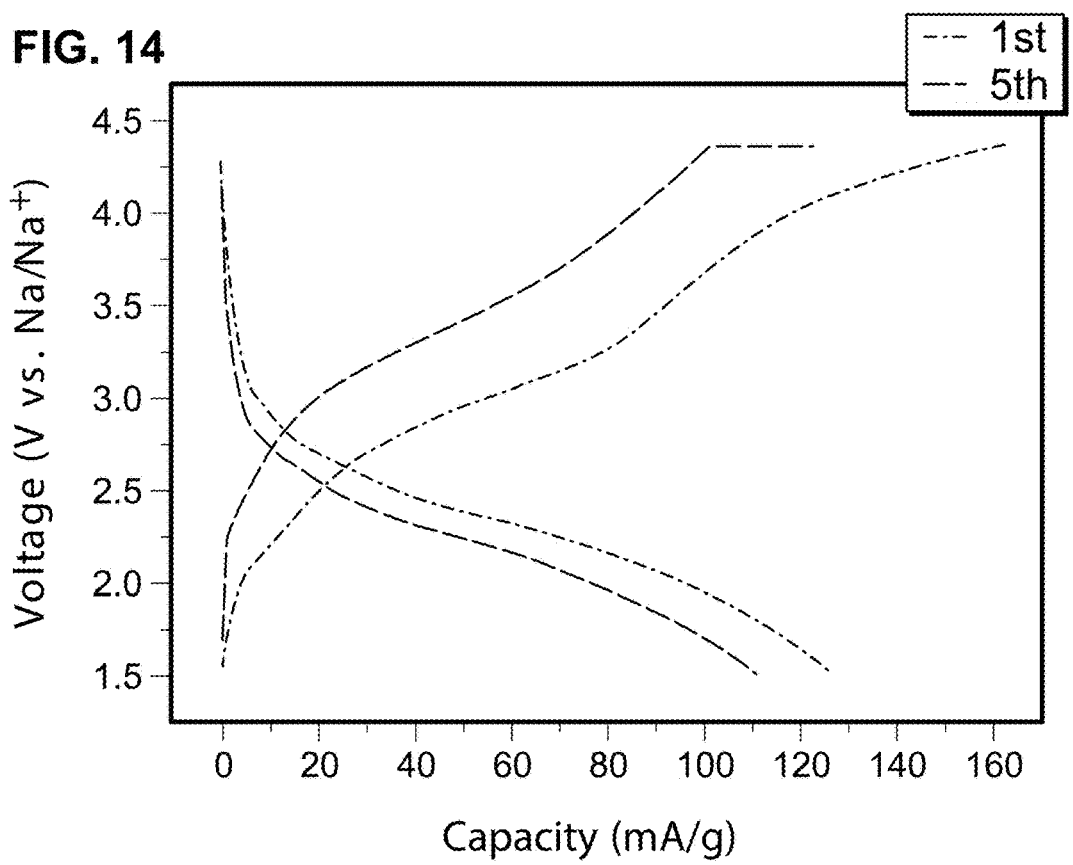
FIG. 14 is a graphical representation of one example embodiment of the discharge capacity of a ball-milled energy storage composition.
Figure 15:
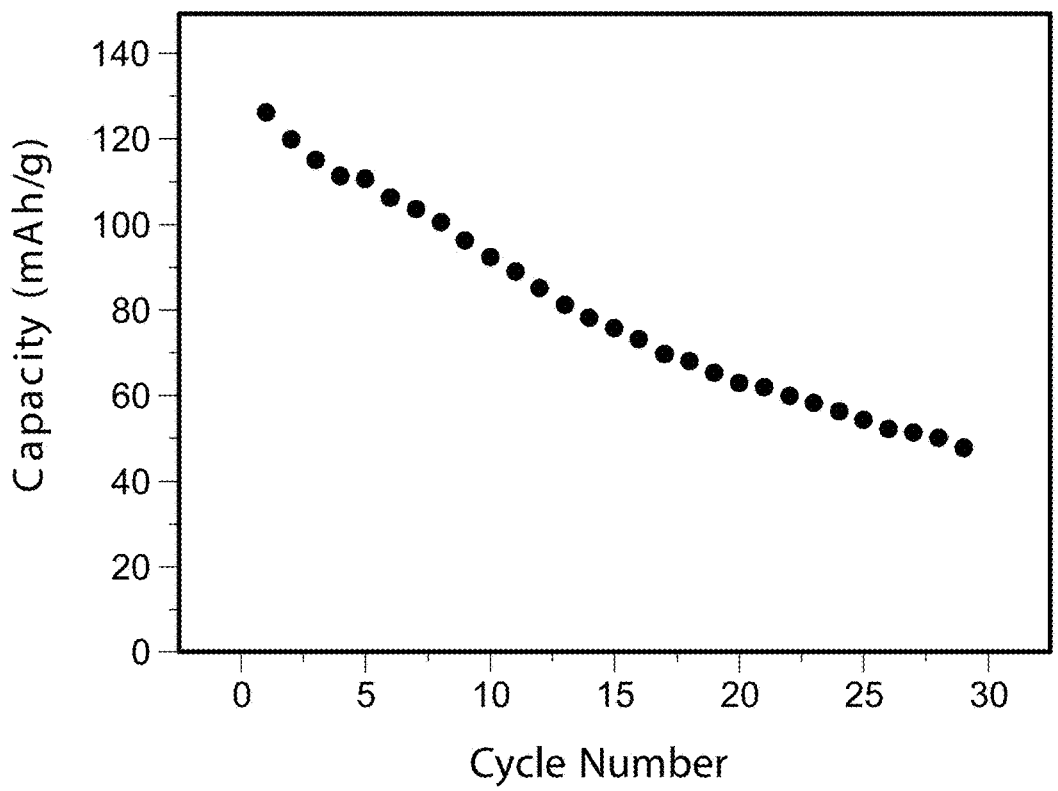
FIG. 15 is a graphical representation of a ball-milled energy storage composition discharge capacity over 30 cycles.

Ball milling is used to grind materials into a fine powder by mechanical impact. FIG. 12 illustrates the theory of ball milling. FIG. 13 describes one embodiment of energy storage composition. As shown, $Na_{1.702}Fe_3(PO_4)_3$ is exposed to ball milling, which alters size and morphology of the composition. FIGS. 14 and 15 illustrate one ball milled sample delivering a discharge capacity of 126.5 mAh/g. Further, discharge capacity fading was shown for 30 cycles. In at least one example embodiment, an method of making an energy storage composition or cathode material comprising the steps of dissolving reactants $(NH_4)_2Fe(SO_4)_2.6H_2O$, $H_3PO_4$ and NaOH in water, thereby forming a cathode solution and heating the cathode solution, thereby forming a precipitate. The heating step may be performed for at least 2 hours, at least 3 hours, at least 4 hours and at least 5 hours. The method may optionally include performing the heating step under pressure. In at least these example embodiments, the pressure is at least 30 psi. In other related embodiments, the pressure is 40 psi. In some embodiments, an autoclave is used.

In related embodiments, the reactants are dissolved in water with a 1:1:3 molar ratio. Optionally, the precipitate may be cooled and optionally be filtered. In embodiments where a precipitate is cooled and filtered, the energy storage composition or cathode material may be further dried to form a powder. In at least one example embodiment, the cathode material is $Na_{1.702}Fe_y(PO_4)_z$. In these example embodiments, y is at least 3 or greater than or equal to 1 and less than or equal to 3.5 and z is greater than or equal to 1 and less than or equal to 3. In at least one example embodiment, the cathode material comprises the formula $Na_{1.702}Fe_3(PO_4)_3$. Optionally, the cathode material is coated with carbon, a carbon-based material and combinations thereof. In embodiments that utilize a carbon based material, these materials are selected from a group consisting of polymers, graphite powders, oligomers, graphene sheets, citric acid, ascorbic acid, glucose, sucrose, cellulose, carbohydrates and combinations thereof. In other related embodiments the maximum capacity of the composition is about 160 mAh/g; delivers a reversible capacity of about 46 mAh/g to about 65 mAh/g or 65 mAh/g to about 100 mAh/g or about 120 mAh/g to about 160 mAh/g.

Figure 16:
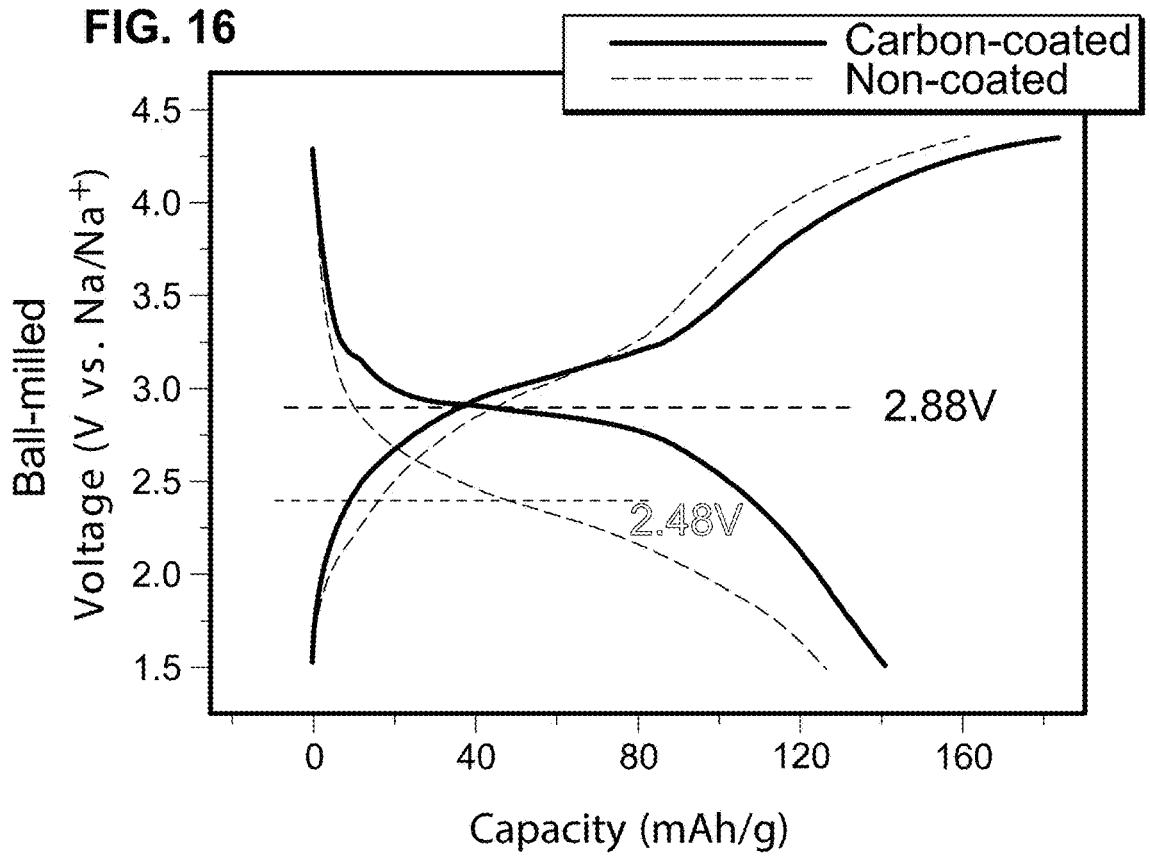
FIG. 16 is a graphical representation of the discharge capacity comparing one example embodiment of carbon coated ball-milled energy storage composition and non-carbon coated ball-milled energy storage composition.
Figure 17:
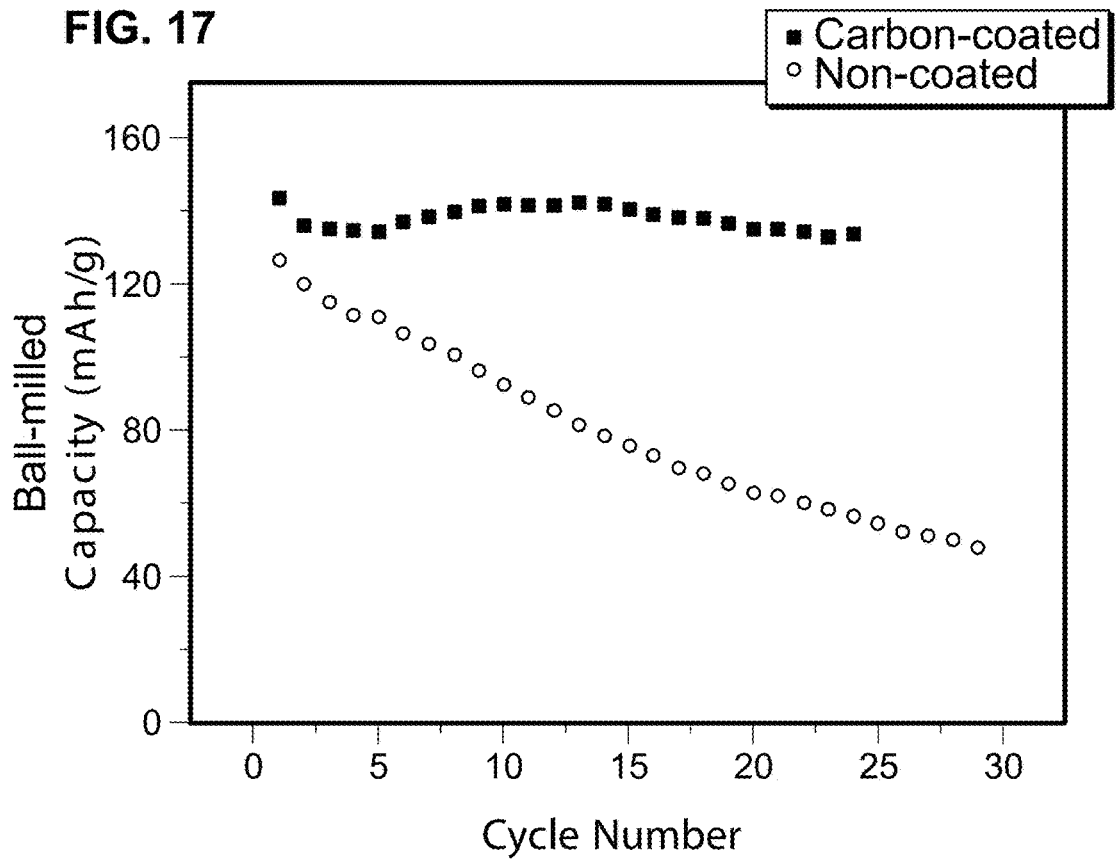
FIG. 17 is a graphical representation of the discharge capacity over 30 cycles comparing one example embodiment of carbon coated ball-milled energy storage composition and non-carbon coated ball-milled energy storage composition.
Figure 18:
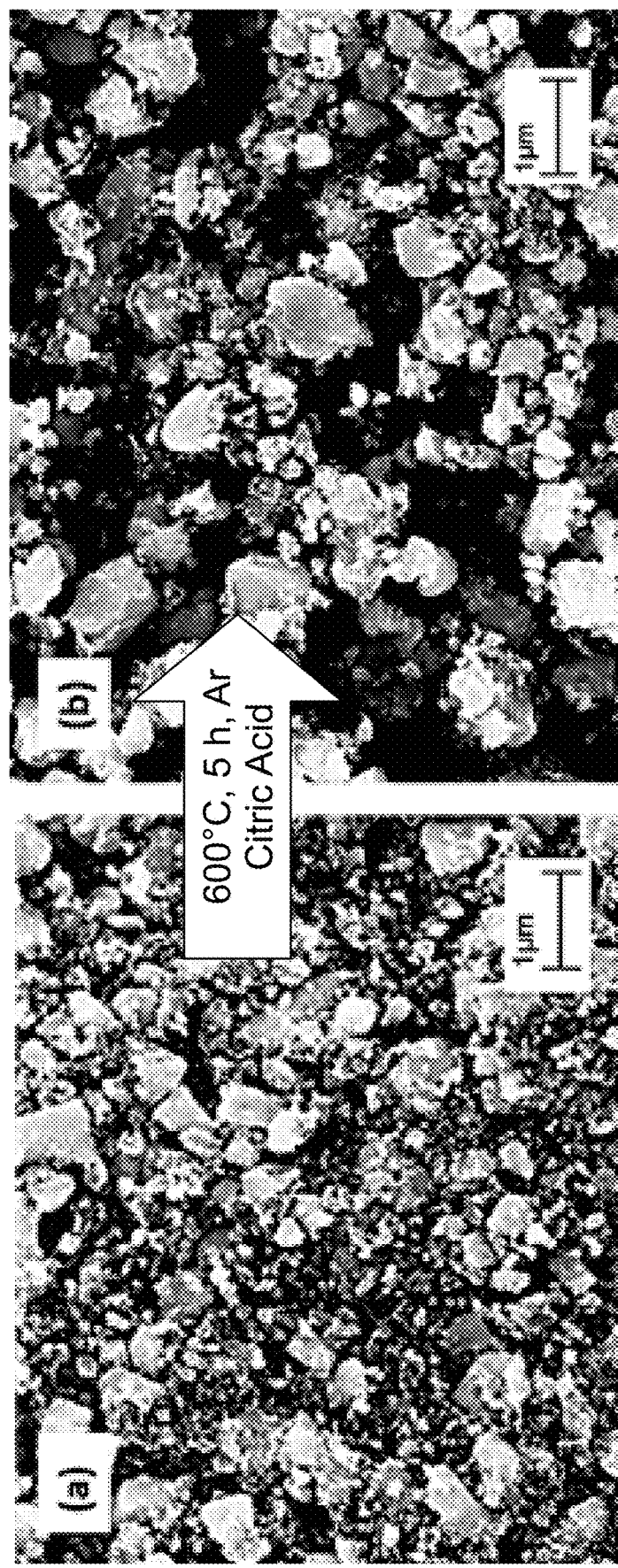
FIG. 18 describes a carbon coated energy storage composition (a) before and (b) after ball-milling.

FIGS. 16-18 disclose a comparison of an energy storage composition ($Na_{1.702}Fe_3(PO_4)_3$) that has been ball milled, but is either carbon coated or non-coated. FIG. 16, carbon-coated ball milled sample (solid line) and non-carbon coated ball-milled sample (dashed line) discharge capacities were compared. The carbon coated ball-milled sample delivers a discharging capacity of ~140 mAh/g. FIG. 17 illustrates no discharge capacity fading after 25 cycles for carbon coated, ball milled $Na_{1.702}Fe_3(PO_4)_3$. FIG. 18a illustrates an SEM micrograph of $Na_{1.702}Fe_3(PO_4)_3$ after ball-milling, where most particles are smaller than 200 nm. FIG. 18b illustrates an SEM micrograph of a ball-milled sample of $Na_{1.702}Fe_3(PO_4)_3$ after carbon coating. XRD patterns of the samples after ball-milling determined broader and lower-intensity peaks, which also indicates that the crystallite size becomes smaller after the ball-milling process.

Figure 19:
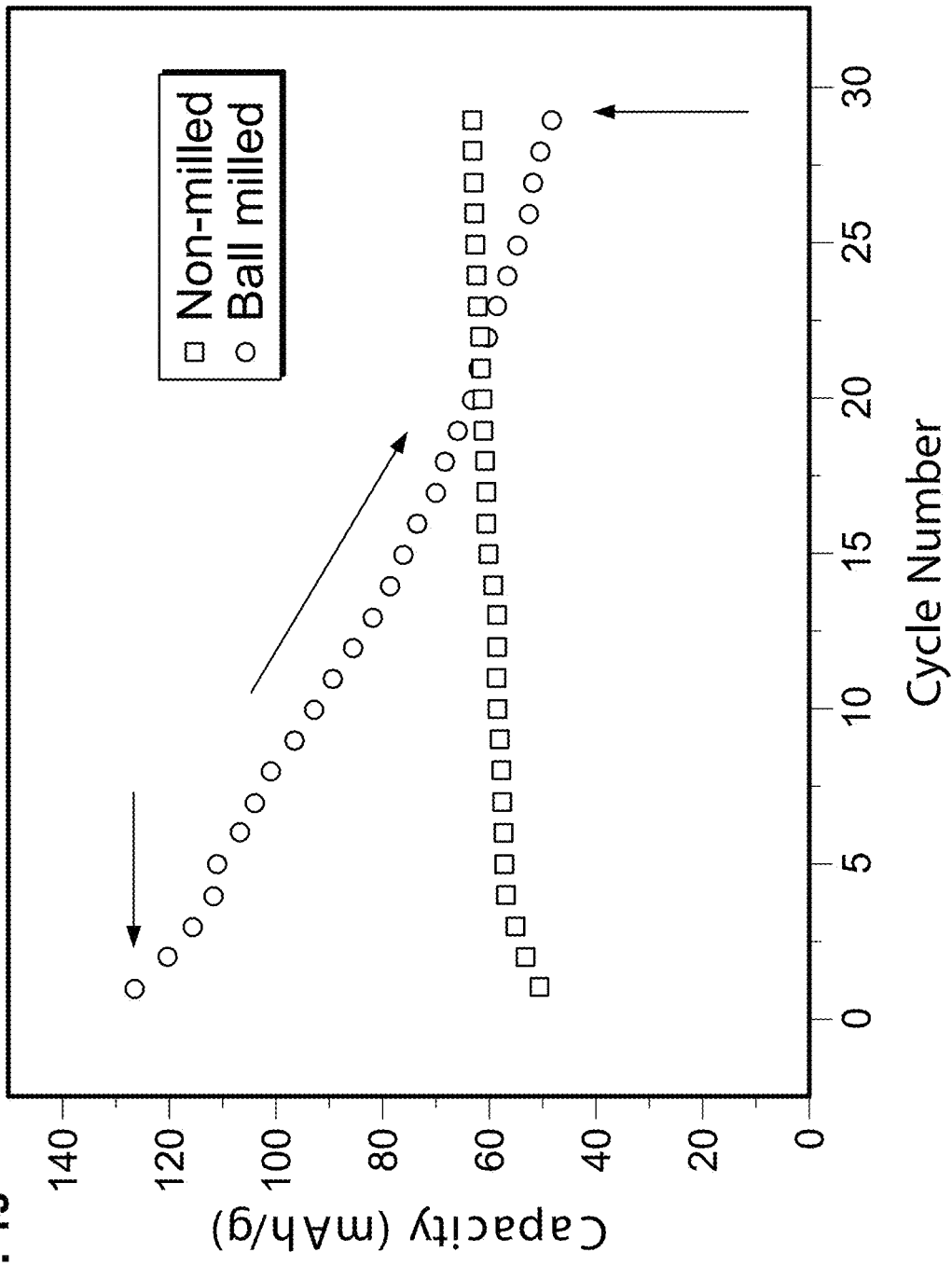
FIG. 19 is a graphical representation of the discharge capacity over 30 cycles comparing one example embodiment of carbon coated ball-milled energy storage composition and carbon coated non ball-milled energy storage composition.

Electrochemical studies were performed on both samples as cathode materials in a Na-ion coin cell. The ball-milled sample shows a discharging capacity of 126.5 mAh/g for the first cycle (see FIG. 19, opened circles), which is improved compared to the non ball-milled sample. However, this cathode exhibits significant capacity fading to only 45 mAh/g by the 30th cycle (see FIG. 19, opened circles). Although not wanting to be bound by any particular theory, the reduced capacity retention is likely due to the decreased crystallinity and surface defect resulted from the high-energy ball milling process. Improvement in battery performance is achieved after carbon coating of the ball-milled material.

The ball-milled/carbon-coated material delivers a reversible capacity of 140.7 mAh/g at C/20 rate (8.2 mA/g), which is close to the theoretical capacity of $Na_{1.702}Fe_3(PO_4)_3$ (≈160 mAh/g). This capacity is the highest value reported for a Na-ion battery using an alluaudite-based cathode. Indeed, this battery exhibits very good cycling performance with 93% of the initial discharge capacity retained after 50 cycles (see FIG. 17). In addition, the average voltage of the ball-milled/carbon-coated material is much higher than the sample not carbon-coated (2.88 V vs. 2.48 V). As a result, the energy density for the ball-milled/carbon-coated $Na_{1.702}Fe_3(PO_4)_3$ cathode in a Na-ion battery is very high (405 Wh/kg). This value is close to the value for $LiMn_2O_4$ (about 430 Wh/kg) and comparable to the value for $LiFePO_4$ (about 500 Wh/kg) in Li-ion batteries. Improved battery performance can be explained by the increased conductivity and more ordered surface layer of the electrode material after carbon coating.

Fewer plateaus appear in the charging and discharging curves for the ball-milled/carbon-coated material compared to the sample that had not been ball-milled (see FIG. 10a). Only two broad peaks and two sharp peaks are present in the CV data (not shown), implying fewer phase transitions during cycling. The differences in extraction/insertion behavior between samples can be interpreted as a decrease in the miscibility gap due to reduction of particle size to the nanoscale. In addition, the disorder of electrode materials introduced by ball-milling process can also affect the phase transition behavior as reported in the case of nano-sized $LiFePO_4$ upon cycling. $Na_{1.702}Fe_3(PO_4)_3$ crystals that have been ball-milled and carbon-coated exhibits excellent rate performance when compared with other known polyanion-type cathode materials proposed for Na-ion batteries (see FIG. 21). This particular embodiment of an alluaudite compound may perform better than carbon-coated $LiFePO_4$ (in a Li-ion battery).

Figure 20:
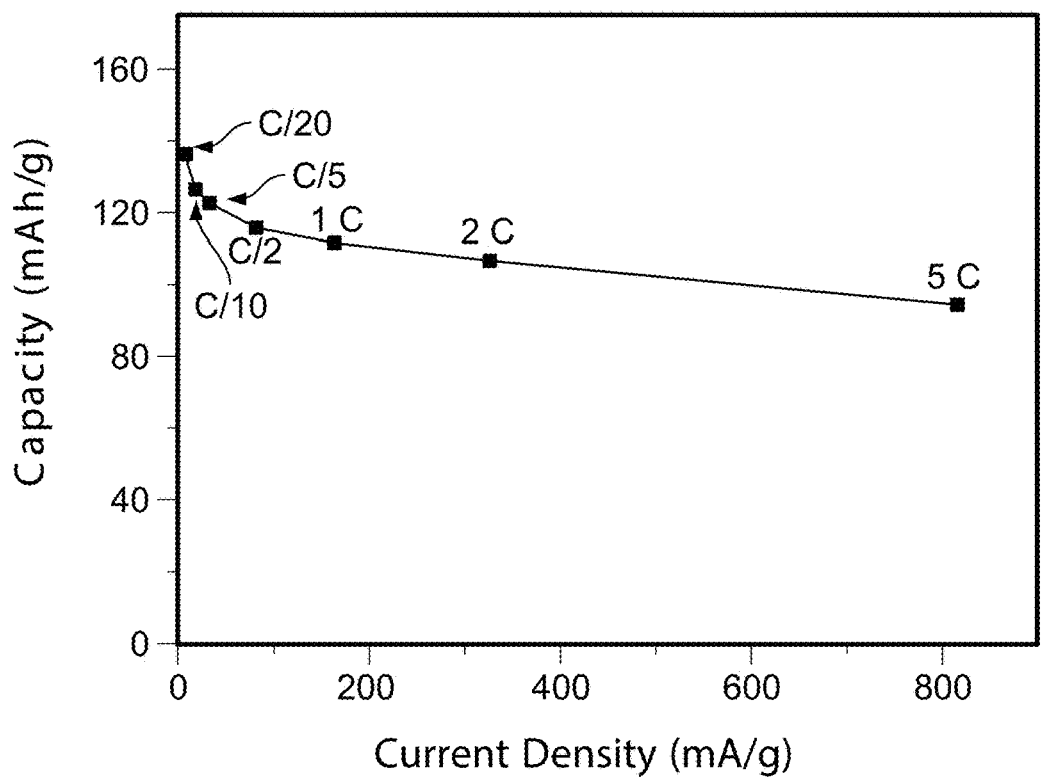
FIG. 20 is a graphical representation of rate capability of one example embodiment of an energy storage composition.
Figure 21:
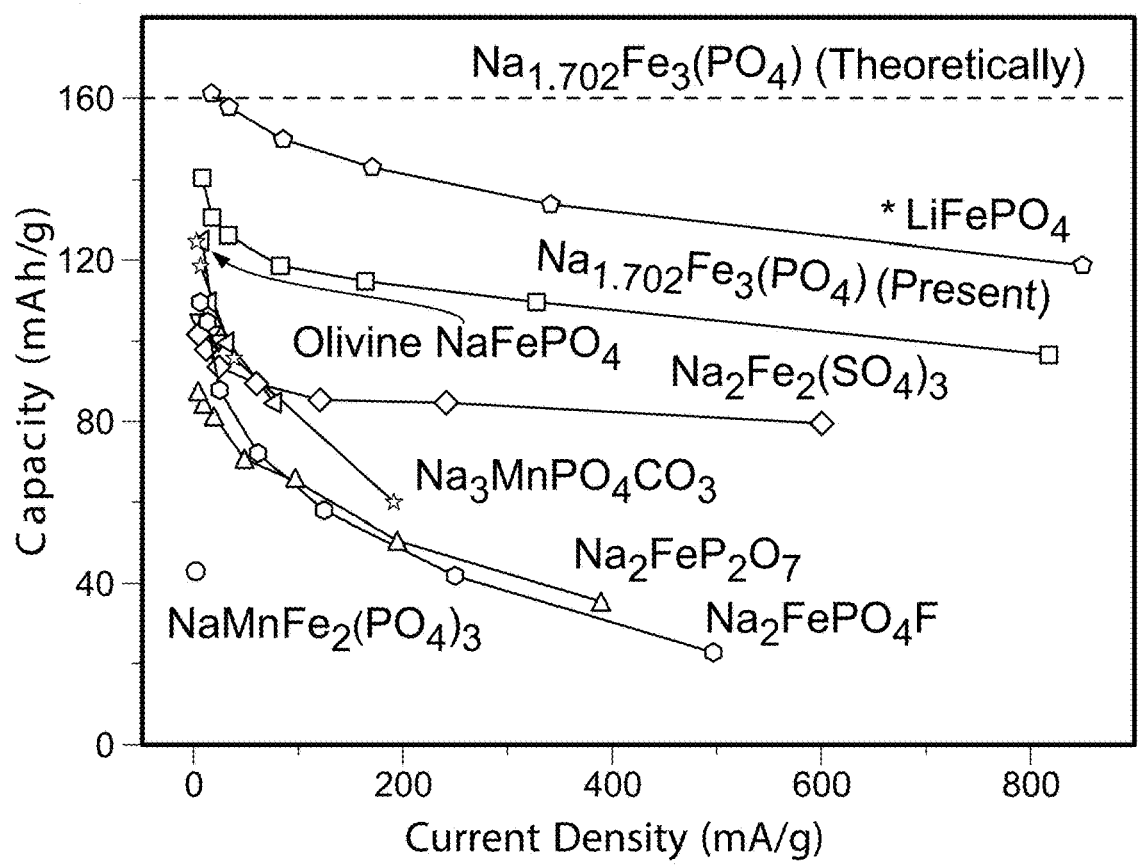
FIG. 21 is a graphical comparison of one example embodiment of an energy storage composition compared with other cathode materials.

FIG. 20 illustrates rate capability of $Na_{1.702}Fe_3(PO_4)_3$. The capacity of a rechargeable battery is commonly rated at 1 C, meaning that a 1,000 mAh battery should provide a current of 1,000 mA for one hour. The same battery discharging at 0.5 C would provide 500 mA for two hours, and at 2 C, the 1,000 mAh battery would deliver 2,000 mA for 30 minutes. 1 C is also known as a one-hour discharge; a 0.5 C is a two-hour, and a 2 C is a half-hour discharge. As shown, 5 C equals ⅕ of an hour, which equates to a 12 minute discharge. FIG. 21 is a graphical comparison of $Na_{1.702}Fe_3(PO_4)_3$ versus other cathode materials. The capacity of a rechargeable battery is commonly rated at 1 C, meaning that a 1,000 mAh battery should provide a current of 1,000 mA for one hour. The same battery discharging at 0.5 C would provide 500 mA for two hours, and at 2 C, the 1,000 mAh battery would deliver 2,000 mA for 30 minutes. 1 C is also known as a one-hour discharge; a 0.5 C is a two-hour, and a 2 C is a half-hour discharge.

It should be apparent to one of ordinary skill in the art that the compositions and methods described herein can be used in several stationary power source applications. Although not wanting to be bound by any particular theory, a non-exhaustive list of stationary power storage configurations include; grid-scale storage, household energy storage, marine vessel energy storage and stationary construction storage.

In other example embodiments the energy storage composition (or cathode material) are used to make a battery. In at least one example embodiment, a battery comprises: a cathode comprising a cathode composite layer on a surface of a cathode collector having a cathode active material; an anode including an anode active material; a separator disposed between said cathode and said anode; and an electrolyte including ions, wherein said cathode active material is an energy storage composition. In related embodiments, the cathode active material is represented by the formula: $A_xT_y(PO_4)_z$. In at least one related embodiment, the cathode active material contains particles having an average particle size of greater than or equal to about 200 nm and less than or equal to 1 μm.

In at least one example embodiment, the energy storage composition where A is selected from a group consisting of Li, Na, Mg, Ca and combinations thereof. In related embodiments, T is selected from a group consisting of Fe, Mn, Co, Ni, Al, Sn and combinations thereof. It should be appreciated that in certain embodiments of the energy storage composition, x is a number greater than or equal to 0 and less than or equal to 3. In other related embodiments, y is at least 3 or greater than or equal to 1 and less than or equal to 3.5 and z is greater than or equal to 1 and less than or equal to 3. Optionally, energy storage composition is coated with carbon, a carbon-based material and combinations thereof. In embodiments that utilize a carbon based material, these materials are selected from a group consisting of polymers, graphite powders, oligomers, graphene sheets, citric acid, ascorbic acid, glucose, sucrose, cellulose, carbohydrates and combinations thereof. In other related embodiments the maximum capacity of the composition is about 160 mAh/g; delivers a reversible capacity of about 46 mAh/g to about 65 mAh/g or 65 mAh/g to about 100 mAh/g or about 120 mAh/g to about 160 mAh/g.

The synthesis, structure, electrochemical properties of the alluaudites $A_xT_y(PO_4)_z$, $Na_xT_y(PO_4)_z$, $Na_{1.702}Fe_3(PO_4)_3$ and $Na_{0.872}Fe_3(PO_4)_3$ are described herein. As disclosed above, the composition phase of $Na_{1.702}Fe_3(PO_4)_3$ is shown as an energy storage material, used as a cathode in a Na-ion battery. This material was synthesized using a simple hydrothermal reaction at moderate temperature. With ball milling and carbon coating, $Na_{1.702}Fe_3(PO_4)_3$ exhibits exceptional electrochemical properties based on the $Fe^{3+}/Fe^{2+}$ redox couple. The partially de-sodiated compound, $Na_{0.872}Fe_3(PO_4)_3$, is obtained as a new alluaudite compound. Alluaudite materials with the formulas $A_xT_y(PO_4)_z$, $Na_xT_y(PO_4)_z$, $Na_{1.702}Fe_3(PO_4)_3$ and $Na_{0.872}Fe_3(PO_4)_3$ are a very promising cathode material for Na ion batteries that target large-scale applications because of its scalable and low cost synthesis, environmentally benign composition, high capacity (140.7 mAh/g), high energy density (405 Wh/kg), excellent rate capability, and good thermal stability.

Although exemplary embodiments of principles of this disclosure have been described in detail above, those skilled in the art will readily appreciate that many modifications are possible without materially departing from the principles.

What is claimed is:

1. An energy storage composition comprising the formula:
   $A_xT_y(PO_4)_z$, wherein:
   A is selected from a group consisting of Mg, and Ca;
   T is selected from a group consisting of Ni, Al, and Sn;
   x is selected from a number greater than or equal to 0.5 and less than 0.8, a number greater than or equal to 1.2 and less than 1.6, or a number greater than 1.8 and less than 2;
   y a number greater than or equal to 1 and less than or equal to 2.5; and
   z is a number greater than or equal to 1 and less than or equal to 2.5.

2. The energy storage composition of claim 1 wherein the composition is coated with a material selected from the group consisting of carbon, a carbon-based material or combinations thereof.

3. The energy storage composition of claim 2 wherein the carbon-based material is selected from a group consisting of polymers, graphite powders, oligomers, graphene sheets, citric acid, ascorbic acid, carbohydrates and combinations thereof.

4. The energy storage composition of claim 1 wherein:
   A is Ca;
   T is selected from a group consisting of Al, and Sn;
   x is selected from a number greater than or equal to 0.6 and less than 0.8, a number greater or equal to 1.2 and less than 1.6, or a number greater than 1.8 and less than 2;
   y a number greater than or equal to 1 and less than or equal to 2.5;
   z is a number greater than or equal to 1 and less than or equal to 2.5; and
   further wherein the composition is coated with a material selected from the group consisting of carbon, a carbon-based material or combinations thereof.

5. The energy storage composition of claim 4 wherein the carbon-based material is selected from a group consisting of polymers, graphite powders, oligomers, graphene sheets, citric acid, ascorbic acid, carbohydrates and combinations thereof.

6. A battery comprising:
   (i). a cathode comprising a cathode composite layer on a surface of a cathode collector having a cathode active material;
   (ii). an anode including an anode active material;
   (iii). a separator disposed between said cathode and said anode; and
   (iv) an electrolyte including ions, wherein said cathode active material is an energy storage composition,
   wherein the energy storage composition comprises the formula: $A_xT_y(PO4)_z$, wherein:
   A is selected from a group consisting of Mg, and Ca;
   T is selected from a group consisting of Co, Ni, Al, and Sn;
   x is selected from a number greater than or equal to 0.5 and less than 0.8, Of a number greater than or equal to 1.2 and less than 1.6, or a number greater than 1.8 and less than 2;
   y a number greater than or equal to 1 and less than or equal to 2.5; and
   z is a number greater than or equal to 1 and less than or equal to 2.5.

7. The battery of claim 6 wherein the energy storage composition is coated with a material selected from the group consisting of carbon, a carbon-based material or combinations thereof.

8. The battery of claim 7 wherein the carbon-based material is selected from a group consisting of polymers, graphite powders, oligomers, graphene sheets, citric acid, ascorbic acid, carbohydrates and combinations thereof.

9. The Battery of claim 7 wherein:
   A is Ca;
   T is selected from a group consisting of Al, and Sn;
   x is selected from a number greater than or equal to 0.5 and less than 0.8, a number greater than or equal to 1.2 and less than 1.6, or a number greater than 1.8 and less than 2;
   y a number greater than or equal to 1 and less than or equal to 2.5; and
   z is a number greater than or equal to 1 and less than or equal to 2.5; and
   further wherein the composition is coated with a material selected from the group consisting of carbon, a carbon-based material or combinations thereof.

10. The battery of claim 9 wherein the carbon-based material is selected from a group consisting of polymers, graphite powders, oligomers, graphene sheets, citric acid, ascorbic acid, carbohydrates and combinations thereof.

* * * * *